(12) United States Patent
Goyette et al.

(10) Patent No.: US 10,990,988 B1
(45) Date of Patent: Apr. 27, 2021

(54) FINDING BUSINESS SIMILARITIES BETWEEN ENTITIES USING MACHINE LEARNING

(71) Applicants: Steve George Goyette, Maple Ridge (CA); Yogish Pai, Los Gatos, CA (US); Xuerui Han, Victoria (CA)

(72) Inventors: Steve George Goyette, Maple Ridge (CA); Yogish Pai, Los Gatos, CA (US); Xuerui Han, Victoria (CA)

(73) Assignee: Intuit Inc., Mountain View, CA (US)

( * ) Notice: Subject to any disclaimer, the term of this patent is extended or adjusted under 35 U.S.C. 154(b) by 500 days.

(21) Appl. No.: 15/858,618

(22) Filed: Dec. 29, 2017

(51) Int. Cl.
*G06Q 30/02* (2012.01)
*G06Q 10/06* (2012.01)
*G06F 16/35* (2019.01)

(52) U.S. Cl.
CPC ....... *G06Q 30/0202* (2013.01); *G06F 16/358* (2019.01); *G06Q 10/0637* (2013.01)

(58) Field of Classification Search
CPC ........... G06Q 30/0202; G06Q 30/0201; G06Q 30/0203; G06Q 30/0204; G06Q 10/0637; G06F 16/358
See application file for complete search history.

(56) References Cited

U.S. PATENT DOCUMENTS

| | | | | | |
|---|---|---|---|---|---|
| 6,976,001 | B1 * | 12/2005 | Levanoni | ............... | G06Q 10/06 705/7.31 |
| 9,372,687 | B1 * | 6/2016 | Pai | ........................... | G06F 8/71 |
| 10,242,336 | B1 * | 3/2019 | Agarwal | ............... | G06Q 10/083 |
| 10,395,276 | B1 * | 8/2019 | Fulghum | ............ | G06Q 30/0217 |
| 10,410,272 | B1 * | 9/2019 | Johnson | ............. | G06Q 30/0631 |
| 10,621,203 | B2 * | 4/2020 | Hunt | ...................... | G06F 16/283 |
| 2003/0018513 | A1 * | 1/2003 | Hoffman | ............... | G06Q 10/087 705/7.32 |
| 2003/0033179 | A1 * | 2/2003 | Katz | .................. | G06Q 10/0631 705/7.12 |

(Continued)

OTHER PUBLICATIONS

Classification based forecasting for improved inventory management. (2013). International Journal of Strategic Management, 13(1), 115. Retrieved from https://dialog.proquest.com/professional/docview/1349932426?accountid=161862 (Year: 2013).*

*Primary Examiner* — Tyler W Knox
*Assistant Examiner* — Nicholas D Bolen
(74) *Attorney, Agent, or Firm* — Ferguson Braswell Fraser Kubasta PC

(57) ABSTRACT

A method identifies a plurality of product categories by applying a categorization model to product data that includes product names and product descriptions. The product data is obtained from internal sources and external sources. The method creates a knowledge graph for a plurality of business entities from inputs that include the plurality of product categories, published data that includes merchant categorizations, and geographical data. The method generates cohort clusters of similar business entities by applying a clustering algorithm to the knowledge graph. The method uses the cohort clusters to learn a first extrapolation model for predicting inventory. And the method provides access to the first extrapolation model to predict inventory level at a specific point in time. The access is provided via a merchant application that runs on an online merchant platform.

16 Claims, 19 Drawing Sheets

(56) References Cited

U.S. PATENT DOCUMENTS

| | | | | |
|---|---|---|---|---|
| 2003/0050809 | A1* | 3/2003 | Hoffman | G06Q 10/06315 |
| | | | | 705/7.25 |
| 2006/0004615 | A1* | 1/2006 | Guldner | G06Q 30/0202 |
| | | | | 705/7.11 |
| 2008/0162279 | A1* | 7/2008 | Hershkovitz | G06Q 30/0601 |
| | | | | 705/14.51 |
| 2012/0095949 | A1* | 4/2012 | Bauer | G06Q 30/02 |
| | | | | 706/47 |
| 2014/0136285 | A1* | 5/2014 | Carvalho | G06Q 30/0204 |
| | | | | 705/7.33 |
| 2014/0136549 | A1* | 5/2014 | Surya | G06F 16/9535 |
| | | | | 707/749 |
| 2014/0289006 | A1* | 9/2014 | Palmer | G06F 16/9535 |
| | | | | 705/7.31 |
| 2016/0132800 | A1* | 5/2016 | Davar | G06Q 10/0637 |
| | | | | 705/7.36 |
| 2016/0132902 | A1* | 5/2016 | Davar | G06F 16/22 |
| | | | | 705/7.29 |
| 2016/0132907 | A1* | 5/2016 | DiTomasso | G06Q 30/0202 |
| | | | | 705/7.31 |
| 2018/0082183 | A1* | 3/2018 | Hertz | G06F 16/36 |
| 2018/0158004 | A1* | 6/2018 | Davar | G06Q 10/0637 |
| 2018/0260768 | A1* | 9/2018 | Ng | G06Q 20/203 |
| 2019/0180345 | A1* | 6/2019 | Xie | G06F 17/18 |

* cited by examiner

FINDING BUSINESS SIMILARITIES BETWEEN ENTITIES USING MACHINE LEARNING

Large businesses use predictive models to predict such things as the quantity of inventory on hand and the quantity of cash on hand. These predictive models tend to be based on the historical data of a single business, which works fine when the historical data covers an adequately long period of time, as is usually the case for large businesses.

Many, if not most small businesses, do not have such historical data and therefore face what is called a "cold start" problem when trying to use predictive models.

One possible solution to this problem is to use predictive models that have been trained using the historical data of other small businesses. But all too often, that historical data tends to be too noisy (e.g., have unnecessary, distracting, or confusing information) to create a highly accurate predictive model.

SUMMARY

In general, in one aspect, the invention relates to a method. The method includes identifying a plurality of product categories by applying a categorization model to product data that includes product names and product descriptions. The product data is obtained from internal sources and external sources. The method further includes creating a knowledge graph for a plurality of business entities from inputs that include the plurality of product categories, published data that includes merchant categorizations, and geographical data. The method further includes generating cohort clusters of similar business entities by applying a clustering algorithm to the knowledge graph. The method further includes using the cohort clusters to learn a first extrapolation model for predicting inventory. And the method includes providing access to the first extrapolation model to predict inventory level at a specific point in time. The access is provided via a merchant application that runs on an online merchant platform.

In general, in one aspect, the invention relates to non-transitory computer-readable storage media configured to store a program, which when executed, identifies a plurality of product categories by applying a categorization model to product data that includes product names and product descriptions. The product data is obtained from internal sources and external sources. The program further creates a categorization graph for a plurality of business entities from inputs that include the plurality of product categories, published data that includes merchant categorizations, and geographical data. The program further generates cohort clusters of similar business entities by applying a clustering algorithm to the categorization graph. The program further uses the cohort clusters to learn a first extrapolation model for predicting inventory. And the program provides access to the first extrapolation model to predict inventory level at a specific point in time. The access is provided via a merchant application that runs on an online merchant platform.

In general, in one aspect, the invention relates to a system. The system includes a processor and memory and instructions stored in the memory which, when executed by the processor, identifies a plurality of product categories by applying a categorization model to product data that includes product names and product descriptions. The product data is obtained from internal sources and external sources. The program further creates a categorization graph for a plurality of business entities from inputs that include the plurality of product categories, published data that includes merchant categorizations, and geographical data. The program further generates cohort clusters of similar business entities by applying a clustering algorithm to the categorization graph. The program further uses the cohort clusters to learn a first extrapolation model for predicting inventory. And the program provides access to the first extrapolation model to predict inventory level at a specific point in time. The access is provided via a merchant application that runs on an online merchant platform.

Other aspects of the invention will be apparent from the following description and the appended claims.

BRIEF DESCRIPTION OF DRAWINGS

FIGS. 10A and 10B show a view in a graphical user interface (GUI) displayed by an online shop on a merchant platform, in accordance with one or more embodiments.

DETAILED DESCRIPTION

Figure 1:
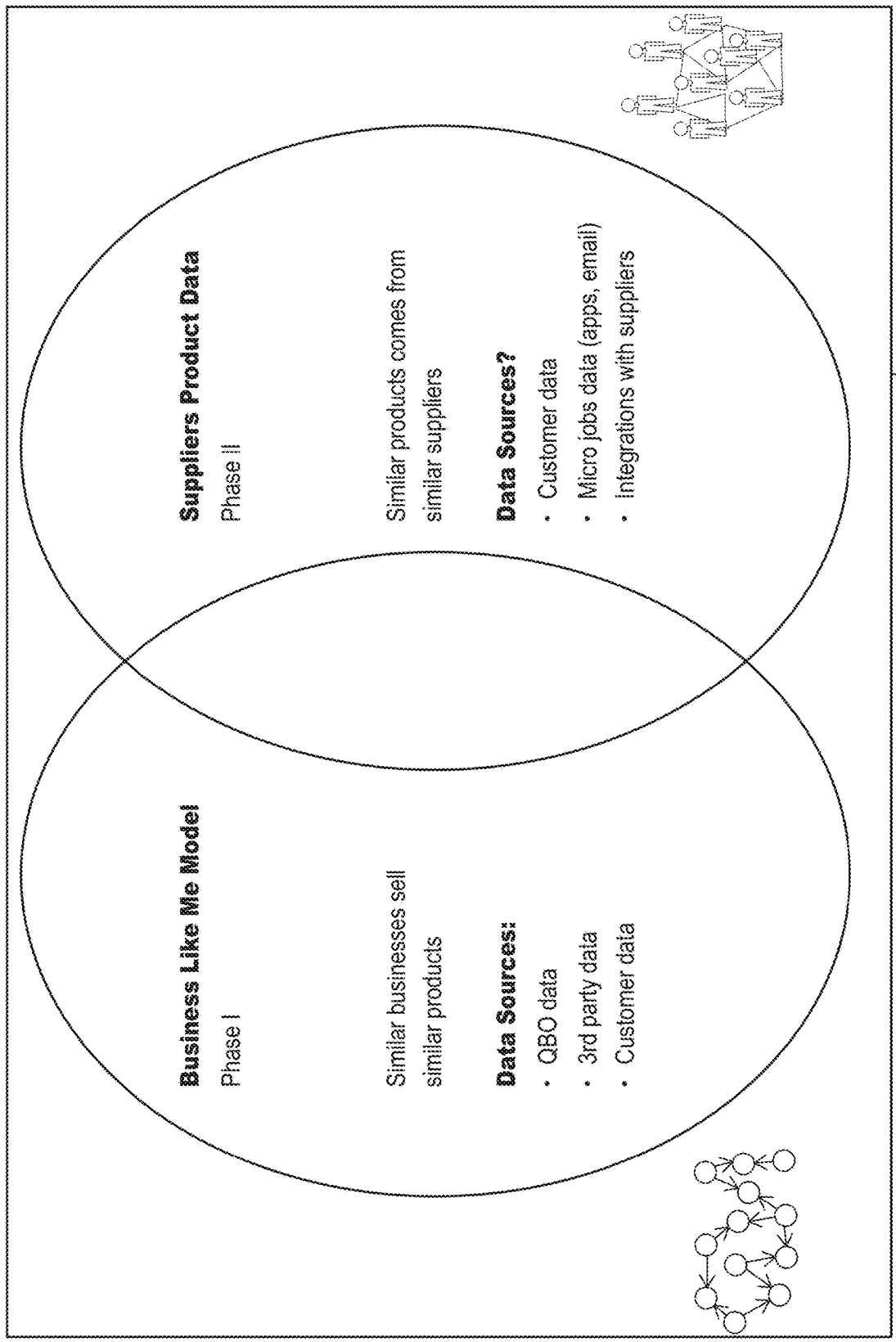
FIG. 1 depicts a Venn diagram for finding similar business entities, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

In general, one or more embodiments of the invention help solve the "cold start problem" that small businesses face when trying to use predictive models. These embodiments generate cohort clusters of similar businesses through the application of a clustering algorithm to a categorization graph created from business-entity data. The cohort clusters are then used to train predictive models which are much more accurate than predictive models trained without such cohort clusters. In some embodiments, the predictive models are created and maintained by an online financial service (such as one provided by Intuit®) and access to the predictive models is provided to small businesses through an app distributed via an app store for an online merchant platform. Such an app might be distributed for free as a means to educate small businesses in best accounting practices and thereby persuade them to become customers of an online financial service.

FIG. 1 depicts a Venn diagram for finding similar business entities, in accordance with one or more embodiments. As noted in Venn diagram (101), research performed in connection with the embodiments disclosed herein shows that similar business entities sell similar products. Therefore, some of the embodiments use business entity data from the online financial service (e.g., QuickBooks Online™), third-party data (e.g., from Semantics3™), and the customer to construct a categorization graph for products. Research performed in connection with such embodiments shows a categorization accuracy exceeding 80%. The categorization graph then becomes an input into a clustering algorithm that creates cohort clusters of similar business entities and the cohort cluster clusters are used to learn the extrapolation models. Once the extrapolation models are learned, the models can be applied to the business entity data of a customer.

Continuing with FIG. 1, as shown in Venn diagram (101), similar research shows that similar products are supplied by similar business entities. Therefore, some of the embodiments use business entity data from the customer, micro-jobs (e.g., apps, email, etc.) and integrations with suppliers to construct a categorization graph for products that can be used to create cohort clusters of similar business entities. In one or more embodiments, the categorization graph is a categorization graph for services rather than products and such a graph is input to the clustering algorithm to generate cohort clusters of similar businesses.

Figure 2A:
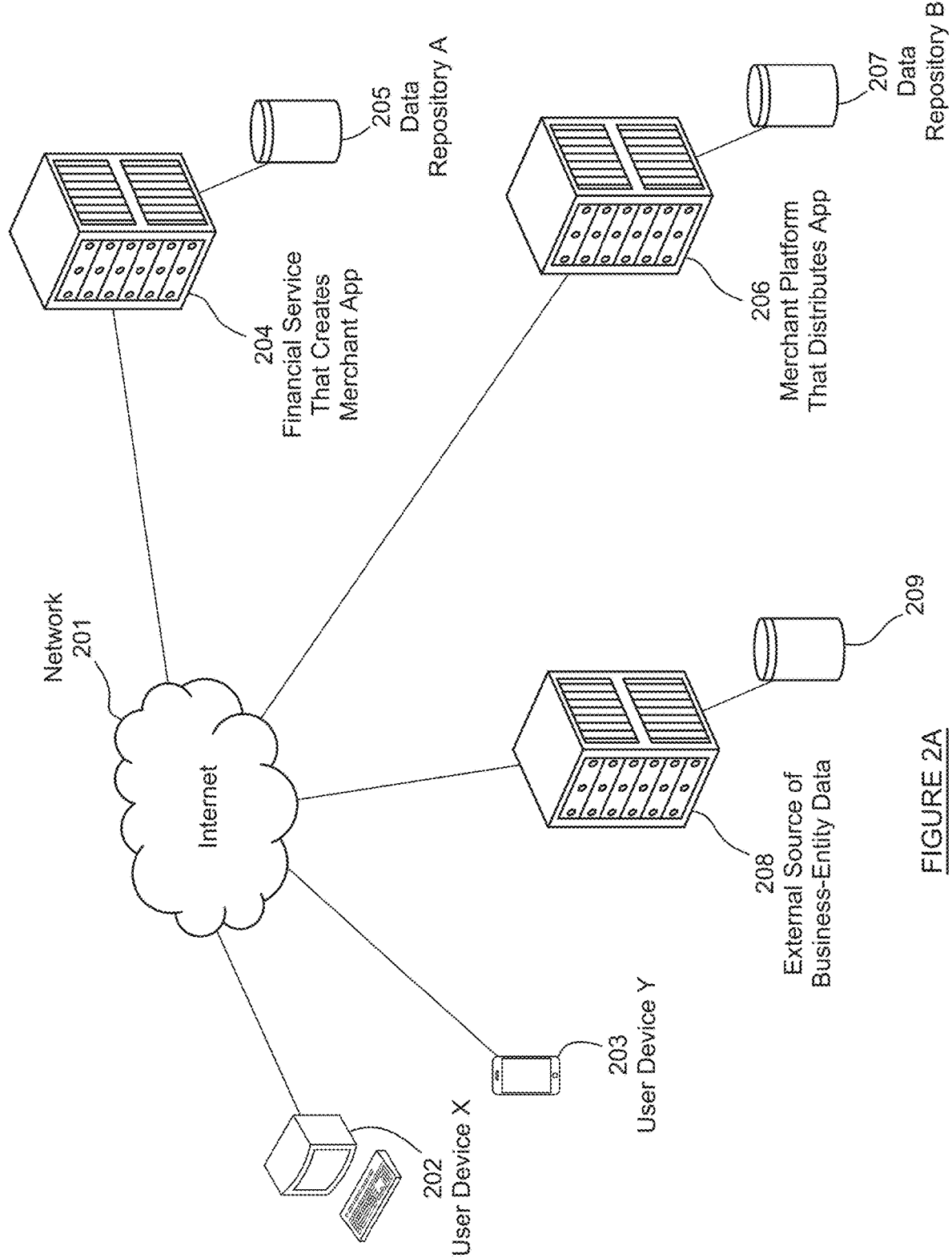
FIG. 2A depicts a network diagram showing a system for finding similar business entities, in accordance with one or more embodiments.

FIG. 2A depicts a network diagram showing a system for finding similar business entities, in accordance with one or more embodiments. In the context of this figure, the users are small-business owners. As depicted in FIG. 2A, these users might use user computing device X (202) (e.g., a laptop or other personal computer) and/or user computing device Y (203) (e.g., a mobile device such as a smartphone or a tablet computer to access over network (201): (a) a financial service (204) with computing resources (e.g., hardware servers) that host a financial application, such as a massively multi-user online accounting application (e.g., QuickBooks Online™); and/or (b) an online merchant platform (206), such as Shopify™. Network (201) is a wide area network (WAN) including the Internet, which is wireless in part or in whole. Also, financial service (204) uses network (201) to access online merchant platform (206) and external source of business-entity data (208), which might be, e.g., a website hosting a social network or a website provided by a governmental agency.

In one or more embodiments, computing device X (202) and the servers at financial service (204), merchant platform (206), and external source (208) include: (1) hardware with one or more microprocessors (e.g., from the x86 family, the ARM family, or the PowerPC family), volatile storage (e.g., RAM), and persistent storage (e.g., flash memory, a hard disk, or a solid-state drive); and (2) an operating system (e.g., WINDOWS®, MACOS®, LINUX®, WINDOWS SERVER™, etc.) capable of running on the hardware.

In one or more embodiments, user computing device Y (203) is a smart phone and includes: (1) hardware with one or more microprocessors (e.g., from the ARM family or the x86 family), volatile storage (e.g., RAM), and persistent storage (e.g., flash memory such as microSD); (2) an operating system (e.g., iOS®, ANDROID™, WINDOWS MOBILE®, LINUX®, SYMBIAN OS®, etc.) that runs on the hardware; (3) one or more accelerometers, one or more gyroscopes, one or more magnetometers, one or more pedometers, and one or more barometers; and (4) a global positioning system (GPS), a global navigation satellite system (e.g., GNSS), Visual-Inertial Odometry (VIO), or other location-identifying capability.

In one or more embodiments, financial service (204) includes computing resources with a number of servers (e.g., racked servers) connected by a network (e.g., a local area network (LAN) or a WAN) to each other in a cluster (e.g., a load-balancing cluster, a HADOOP® cluster, a Beowulf cluster, etc.) or other distributed system which might run financial service software (e.g., web-server software, database software, etc.) and distributed-computing and/or cloud software such as Map-Reduce, Google File System, HADOOP®, HADOOP® File System, HADOOP® YARN, Hive, Dremel, CloudBase, Memcached, REDIS®, etc. The servers at financial service (204) are connected to data repository A (205). Data repository A (205) might include flash memory, a redundant array of independent disks (RAID), and/or a storage area network (SAN), in one or more embodiments. Additionally or alternatively, financial service (204) and/or data repository A (205) might be hosted wholly or partially in a public and/or private cloud, e.g., where the cloud resources serve as a platform-as-a-service (PaaS) or an infrastructure-as-a-service (IaaS).

Similarly, the servers at merchant platform (206) might be connected to data repository B (207) which might include flash memory, a redundant array of independent disks (RAID), and/or a storage area network (SAN), in one or more embodiments. The servers at external source (208) might also be connected to data repository (209) which might include flash memory, a redundant array of independent disks (RAID), and/or a storage area network (SAN).

Returning to FIG. 2A, in one or more embodiments, user computing device X (202) and user computing device Y (203) each include a web browser as an application program (or app) or as part of an operating system. Examples of web browsers that might execute on user computing device X (202) include INTERNET EXPLORER®, MOZILLA FIREFOX®, SAFARI®, and GOOGLE CHROME™. Examples of web browsers that might execute on user computing device Y (203) include SAFARI®, MOZILLA FIREFOX®, and Android™. It will be appreciated that users of user computing device X (202) and/or user computing device Y (203) might use web browsers to access financial service (204) and/or merchant platform (206). Additionally or alternatively, users of user computing device X (202) and/or user computing device Y (203) might use other application programs or apps to access financial service (204) and/or merchant platform (206).

As used in this disclosure, business-entity data includes all data associated with a business entity that is internally generated and all data associated with a business entity that is publicly available from external sources. So by way of example, the business-entity data for a business entity includes the names of its products, the descriptions of its products, merchant codes associated with the business entity, locations associated with the business entity, the names of its suppliers, the descriptions of its suppliers, reputational data such as credit reports or Dun & Bradstreet reports associated with the business entity, governmental data associated with the business entity, etc. By way of further example, business-entity data might include all of the data shown in the knowledge graph (220) in FIG. 2C, in one or more embodiments.

Figure 2B:
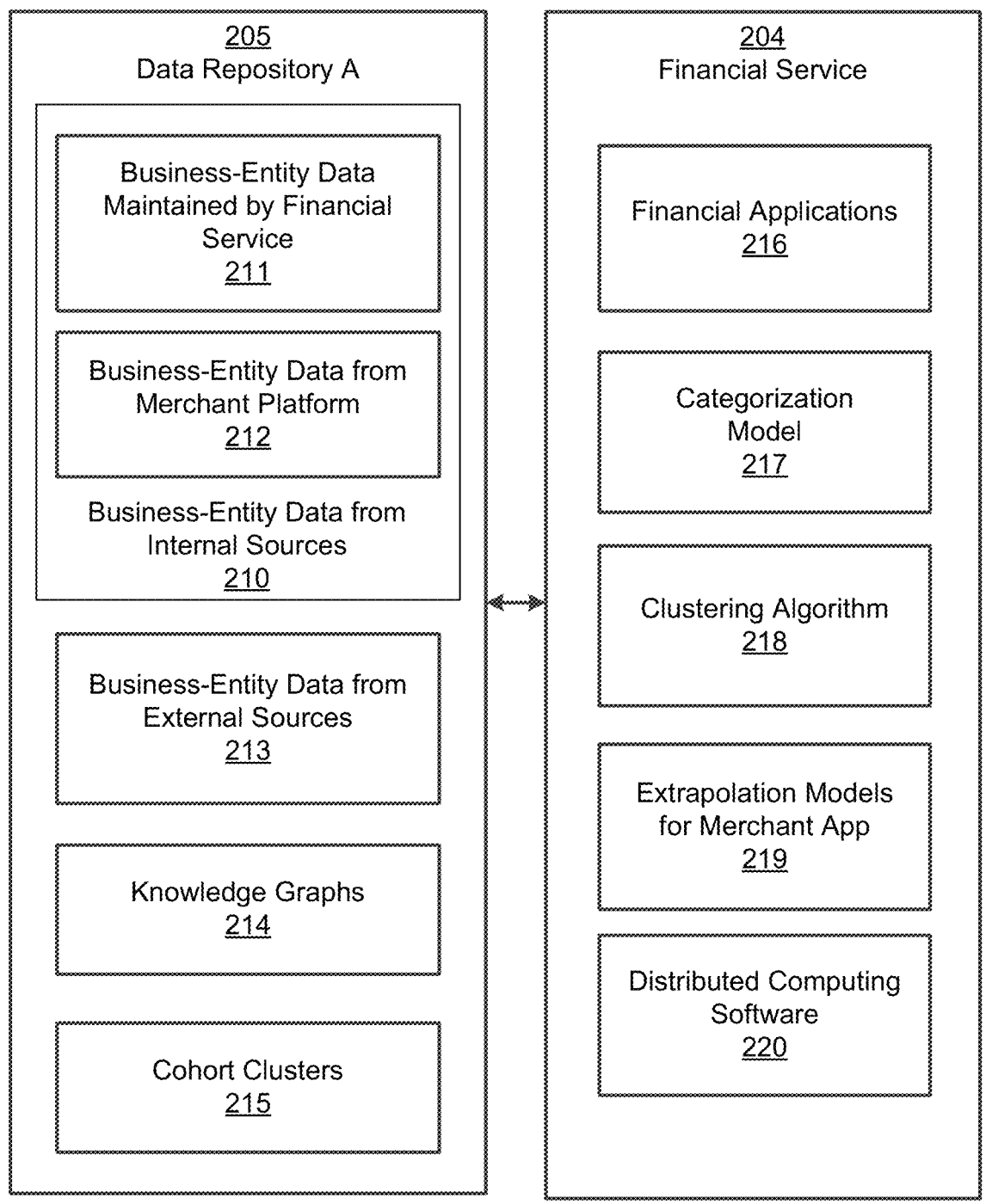
FIG. 2B depicts components used for finding similar business entities, in accordance with one or more embodiments.

FIG. 2B depicts components used for finding similar business entities, in accordance with one or more embodiments. In one or more embodiments, financial service (204) uses data repository A (205) to store algorithms and data related to the processes described in this disclosure. In one or more embodiments, financial service (204) uses data repository A (205) to store business-entity data (210) from internal sources, which includes business-entity data (211) maintained by financial service and business-entity data (212) obtained from merchant platform. It will be appreciated the business entity data (211) might include data obtained from users directly, e.g., through a financial application provided by financial service (204) or indirectly, e.g., through an authorized access to a financial account or financial stream maintained at a commercial bank or credit card company. Similarly, business-entity data (212) might be obtained through an authorized access to the merchant platform, where, e.g., the business entity might maintain an online shop.

As depicted in FIG. 2B, financial service (204) uses data repository (205) to store business-entity data from external sources (213), e.g., using one or more of the data aggregators described below. Such external sources might include a website hosting a social network, a website hosting a reputational organization such as the Better Business Bureau®, a website such as Google Places™ with provides data as to geographical location, a website provided by a governmental agency that regulates business entities, etc.

As also depicted in FIG. 2B, financial service (204) uses data repository (205) to store a knowledge (or categorization) graphs (214), as well as cohort clusters (215). As used in this disclosure, a "categorization graph" is a species of "knowledge graph". In one or more embodiments, knowledge graphs (214) might be stored as a schema in a graph database. As described in greater detail below, knowledge graphs (214) are generated from business-entity data (210) and business-entity data (213) using a categorization model (217) based on a naïve Bayes algorithm, in one or more embodiments. In other embodiments, the categorization model might be based on logistic regression, support vector machines, decision trees, etc. In turn, cohort clusters (215) of similar business entities are generated from knowledge graphs (220) using a clustering algorithm (218) based on K-means, in one or more embodiments. In other embodiments, other clustering algorithm might be used, e.g., Fuzzy C-means, hierarchical clustering, or mixture of Gaussians. As used in this disclosure, a cohort is a group of business entities that share something in common, e.g., similar products and/or similar suppliers. Here it will be appreciated that machine learning tends to be more effective when conducted using cohorts than when conducted using dissimilar entities.

Cohort clusters (215) are used to train extrapolation models (219) that use a hybrid approach involving linear and seasonal extrapolation based on historical transaction data, in one or more embodiments. The extrapolation models run on the server computing devices for the financial services (204), along with categorization model (217), clustering algorithm (218), financial applications (216), and distributed computing software (217), including HADOOP®, HADOOP® YARN, etc.

Figure 3:
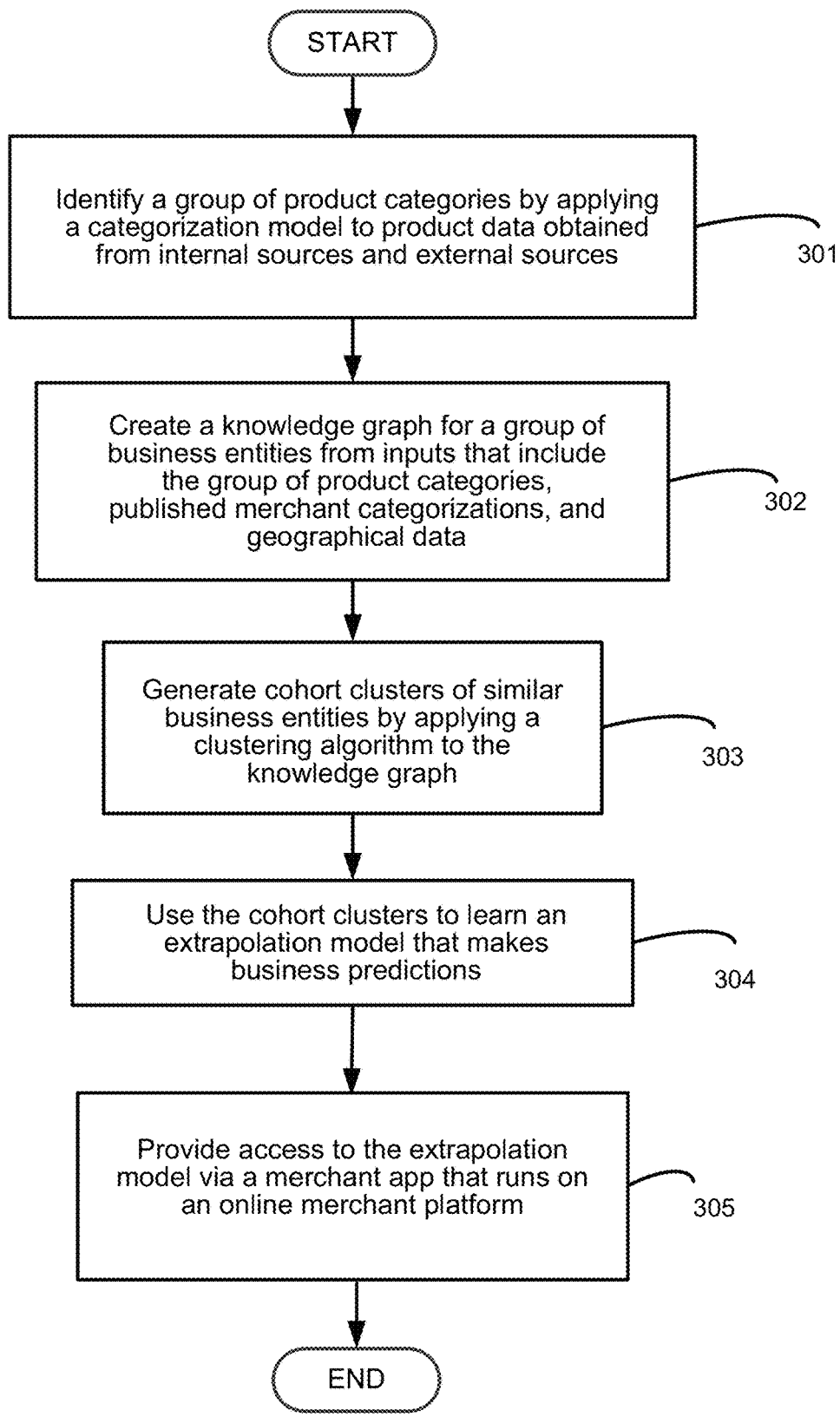
FIG. 3 depicts a flowchart diagram of a process for extrapolation based on business entities that sell similar products, in accordance with one or more embodiments.

FIG. 3 depicts a flowchart diagram of a process for extrapolation based on business entities that sell similar products, in accordance with one or more embodiments. In one or more embodiments, the operations shown in this figure and in the other flowcharts described below are performed by software running on servers at a financial service using a data repository. In one or more embodiments, one or more of the operations shown in FIG. 3 and in the other flowcharts described below are performed on clustered computers running distributed-computing software that supports batch processing based on a Map-Reduce architecture (e.g., HADOOP®). In one or more embodiments, one or more of the operations shown in FIG. 3 and in the other flowcharts described below are performed on clustered computers running distributed-computing software that supports stream processing based on a Map-Reduce architecture (e.g., HADOOP® YARN architecture). In one or more embodiments, all or some of the operations shown in FIG. 3 and in the other flowcharts described below might be performed by software (e.g., a client application including, for example, a webpage with embedded JAVASCRIPT® scripting language program code or ACTIONSCRIPT® scripting language program code) running on a client device, e.g., user computing device X or user computing device Y.

While the various operations in this flowchart and the flowcharts below are presented and described sequentially, one of ordinary skill will appreciate that some or all of the operations may be executed in different orders, may be combined or omitted, and some or all of the operations may be executed in parallel. Furthermore, the operations may be performed actively or passively. For example, some operations may be performed using polling or be interrupt-driven, in accordance with one or more embodiments of the invention. By way of an example, determination operations may not require a processor to process an instruction unless an interrupt is received to signify that a condition exists, in accordance with one or more embodiments of the invention. As another example, determination operations may be performed by performing a test, such as checking a data value to test whether the value is consistent with the tested condition, in accordance with one or more embodiments of the invention.

As depicted in FIG. 3, software, e.g., running on servers at a financial service, identifies a group of product categories by applying a categorization model (e.g., naïve Bayes) to product data obtained from internal sources and external sources, in operation 301. In operation 302, the software creates a knowledge graph for a group of business entities from inputs that include the group of product categories, published merchant categorizations, and geographical data. In operation 303, the software generates cohort clusters of similar business entities by applying a clustering algorithm to the knowledge graph. The software uses the cohort clusters to learn an extrapolation model that makes business predictions, in operation 304. Then in operation 305, the software provides access to the extrapolation model via a merchant app that runs on an online merchant platform.

Figure 4A:
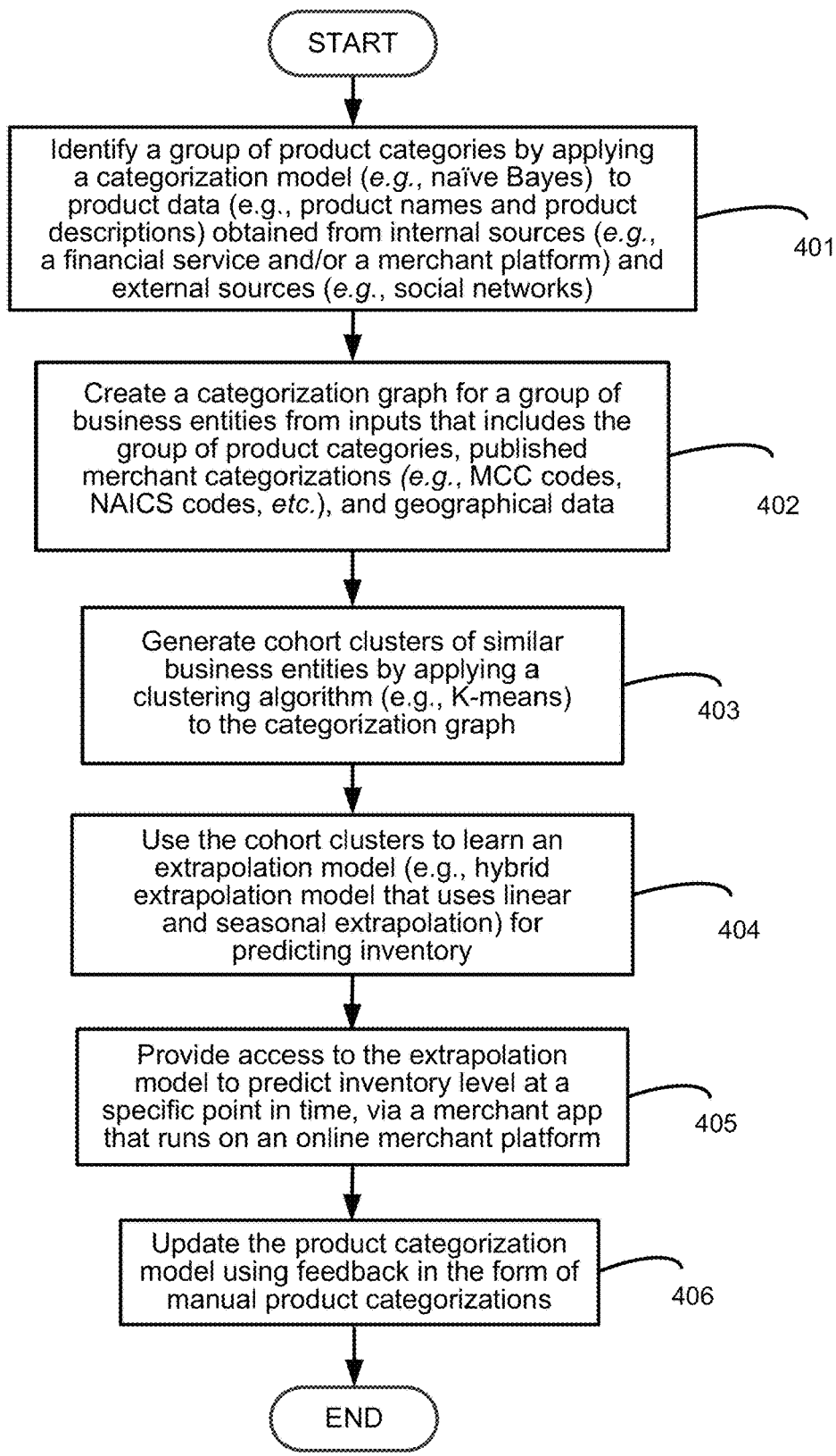
FIG. 4A depicts a flowchart diagram of a process for predicting inventory level based on business entities that sell similar products, in accordance with one or more embodiments.

FIG. 4A depicts a flowchart diagram of a process for predicting inventory level based on business entities that sell similar products, in accordance with one or more embodiments. As depicted in FIG. 4A, software, e.g., running on servers at a financial service, identifies a group of product categories by applying a categorization model to product data (e.g., product names and product descriptions) obtained from internal sources (e.g., the financial service and/or a merchant platform) and external sources (e.g., social networks), in operation 401. In operation 402, the software creates a categorization graph for a group of business entities from inputs that includes the group of product categories, published merchant categorizations (e.g., MCC codes, NAICS codes, etc.), and geographical data. In one or more embodiments, a categorization model based on a naïve Bayes algorithm, might be used to create the categorization graph. In other embodiments, the categorization model might be based on logistic regression, support vector machines, decision trees, etc. Research performed in connection with the embodiments disclosed herein shows that published merchant categorizations tend to be inaccurate, due to self-reporting. Hence the need to use a categorization model based on product data from internal sources and external sources.

In operation 403, the software generates cohort clusters of similar business entities by applying a clustering algorithm (e.g., K-means) to the categorization graph. In operation 404, the software uses the cohort clusters to learn an extrapolation model (e.g., hybrid extrapolation model that uses linear and seasonal extrapolation) for predicting inventory. The software provides access to the extrapolation model to predict inventory level at a specific point in time, via a merchant app that runs on an online merchant platform, in operation 405. In one or more embodiments, the predicted inventory level might be adjusted for seasonality and local current events by the extrapolation model. In operation 406, the software updates the product categorization model using feedback in the form of manual product categorizations.

Figure 4B:
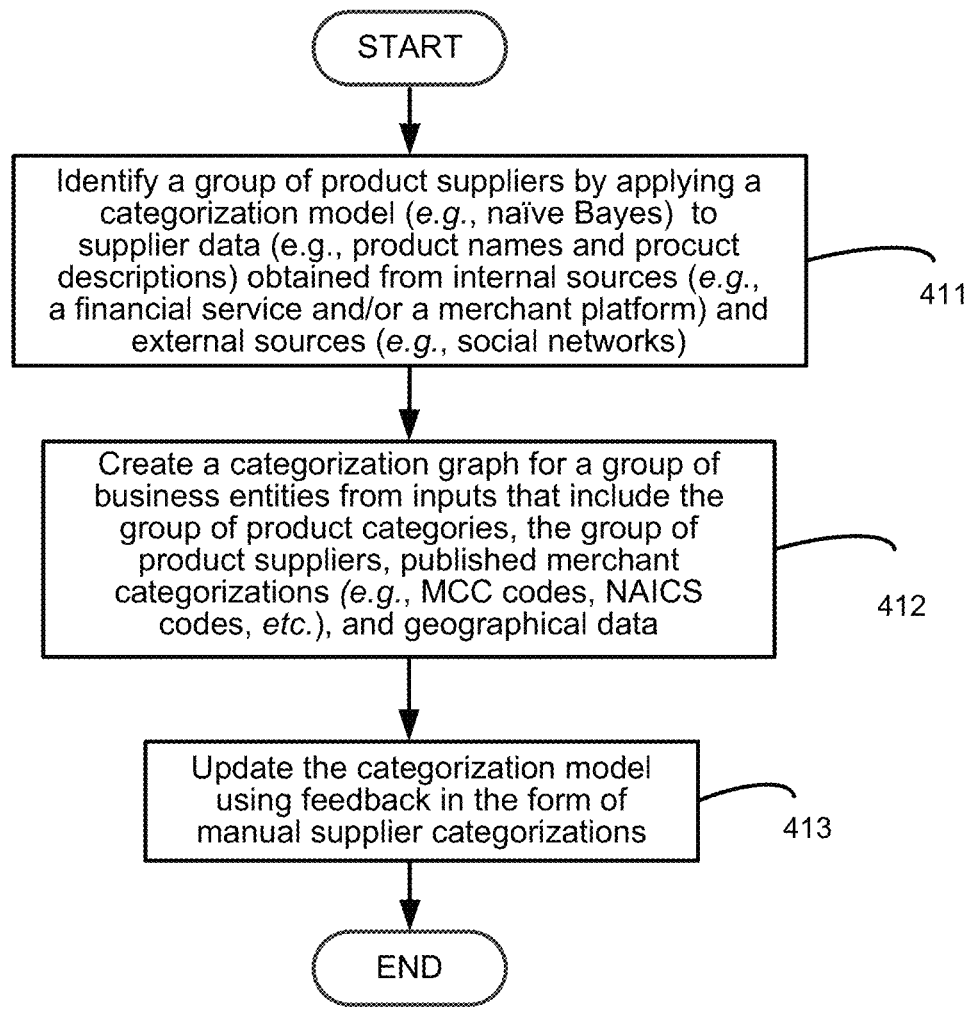
FIG. 4B depicts a flowchart diagram of a process for extrapolation based on business entities that have similar suppliers, in accordance with one or more embodiments.

FIG. 4B depicts a flowchart diagram of a process for extrapolation based on business entities that have similar suppliers, in accordance with one or more embodiments. The operations shown in this flowchart might be used with some or all of the operations in FIG. 4A, in one or more embodiments. As shown in FIG. 4B, software, e.g., running on servers at a financial service, identifies a group of product suppliers by applying a categorization model (e.g., naïve Bayes) to supplier data (e.g., product names and product descriptions) obtained from internal sources (e.g., a financial service and or a merchant platform) and external sources (e.g., social networks), in operation 411. Operation 412 in FIG. 4B replaces operation in 402 in FIG. 4A. In operation 412, the software creates a categorization graph for a group of business entities from inputs that includes the group of product categories, the group of product suppliers, published merchant categorizations (e.g., MCC codes, NAICS codes, etc.), and geographical data. In one or more embodiments, a categorization model based on a naïve Bayes algorithm, might be used to create the categorization graph. In other embodiments, the categorization model might be based on logistic regression, support vector machines, decision trees, etc. Then in operation 413, the software updates the product categorization model using feedback in the form of manual supplier categorizations.

Figure 4C:
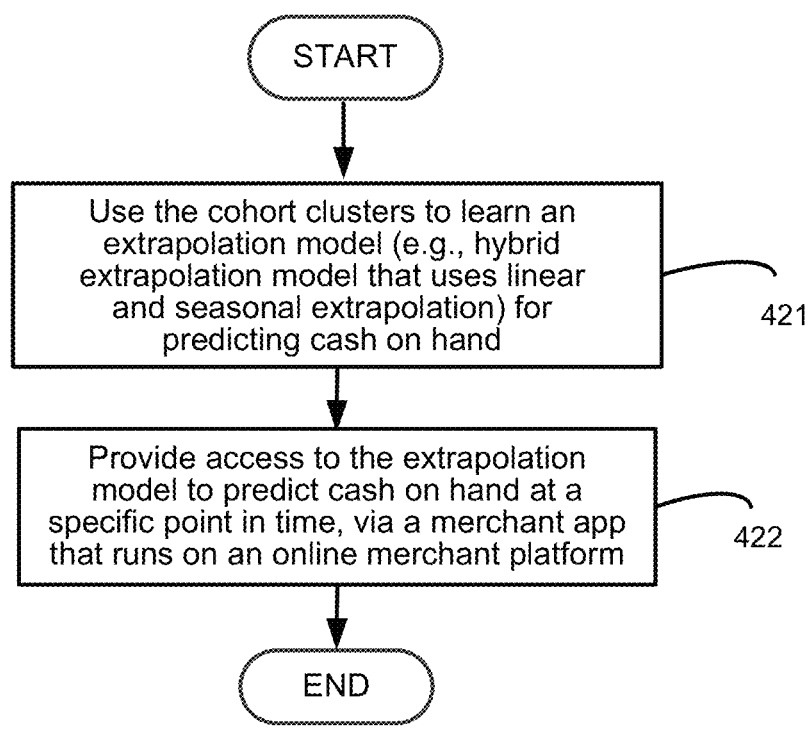
FIG. 4C depicts a flowchart diagram of a process for predicting cash on hand based on business entities that sell similar products, in accordance with one or more embodiments.

FIG. 4C depicts a flowchart diagram of a process for predicting cash on hand based on business entities that sell similar products, in accordance with one or more embodiments. The operations shown in this flowchart might be used with some or all of the operations in FIG. 4A, in one or more embodiments. Additionally, the operations shown in FIG. 4C might be used some or all of the operations in FIG. 4B, in one or more embodiments. As shown in FIG. 4C, software, e.g., running on servers at a financial service, uses the cohort clusters to learn an extrapolation model (e.g., hybrid extrapolation model that uses linear and seasonal extrapolation) for predicting cash on hand, in operation 421. Then in operation 422, the software provides access to the extrapolation model to predict cash on hand at a specific point in time, via a merchant app that runs on an online merchant platform. In one or more embodiments, the predicted cash on hand might be adjusted for seasonality and local current events by the extrapolation model.

Figure 4D:
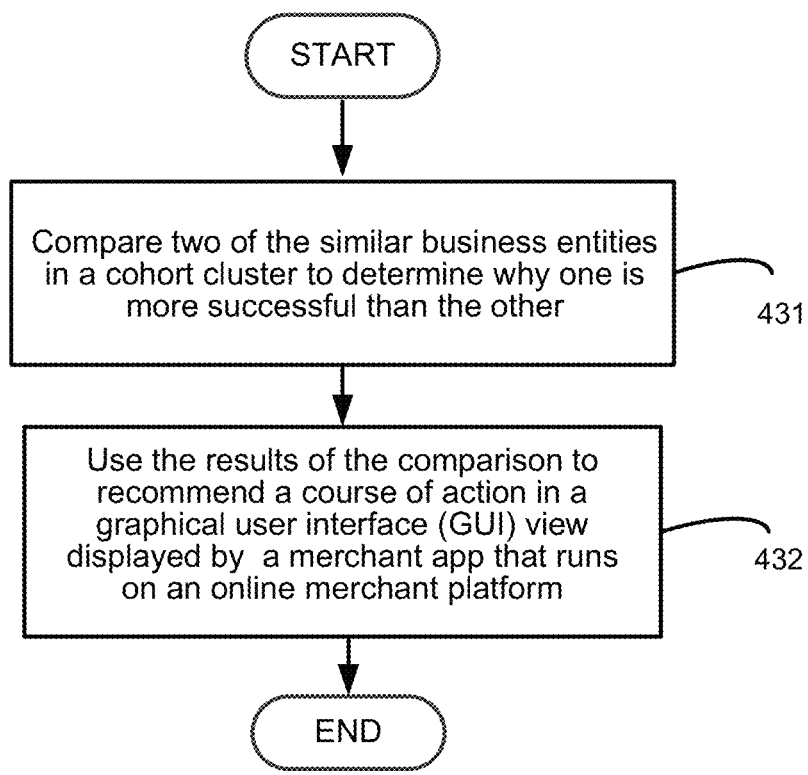
FIG. 4D depicts a flowchart diagram of a process for comparing similar business entities in a cohort cluster, in accordance with one or more embodiments.

FIG. 4D depicts a flowchart diagram of a process for comparing similar business entities in a cohort cluster, in accordance with one or more embodiments. The operations shown in this flowchart might be used with some or all of the operations in FIG. 4A, in one or more embodiments. Additionally, the operations shown in FIG. 4D might be used with some or all of the operations in FIGS. 4B and/or 4C, in one or more embodiments. As shown in FIG. 4D, software, e.g., running on servers at a financial service, compares two of the similar business entities in a cohort cluster to determine why one is more successful than the other, in operation 431. Then in operation 422, the software uses the results of the comparison to recommend a course of action in a graphical user interface (GUI) view displayed by a merchant app that runs on an a merchant platform. For example, the comparison might show that the more profitable business entity uses just-in-time (JIT) inventory ordering, e.g., orders new inventory only when the stock on hand is below a specified threshold that is relatively low in comparison to inventory levels at similar business entities. The software might then recommend use of similar inventory ordering to the less profitable business entity, via a GUI view in the merchant app.

Figure 5:
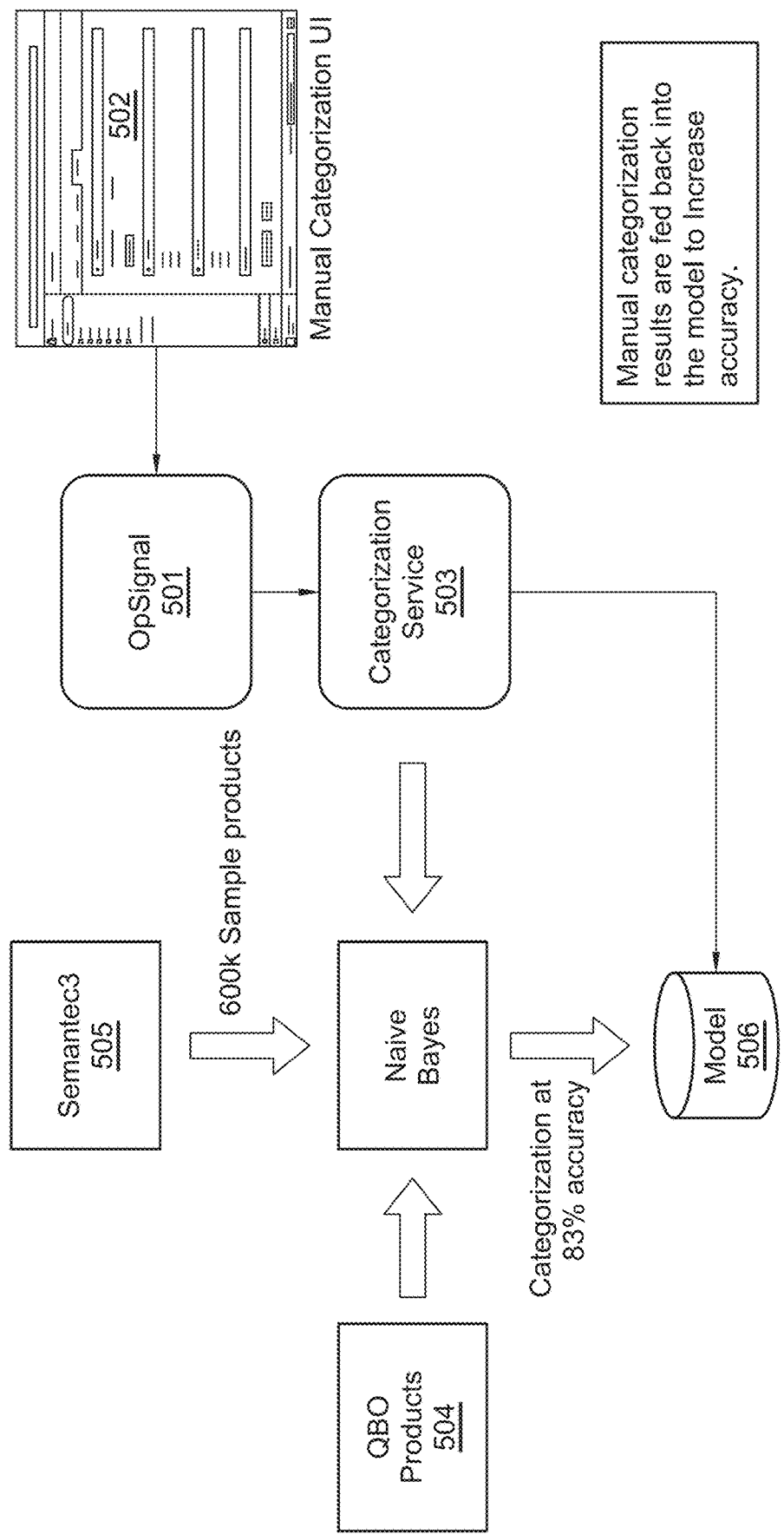
FIG. 5 depicts a process for manually updating a categorization model used by a merchant application, in accordance with one or more embodiments.

FIG. 5 depicts a process for manually updating a categorization model used by a merchant application, in accordance with one or more embodiments. As noted earlier with respect to operation 405 in FIG. 4A and operation 422 in FIG. 4C, software at a financial service might provide access to an extrapolation model via a merchant app that runs on an online merchant platform. Such a merchant app (501) is shown in FIG. 5, where it is called "OpSignal". Merchant app (501) includes a graphical user interface (GUI) that displays a view (502) which allows a user such as Kadee to manually adjust the category for a product. For example, the categorization model (506) applied by the software at the financial service might put a blouse in a category labeled "accessories". Kadee might use view (502) to change the category for the blouse to "tops". Additionally or alternatively, the change might be made by a person employed by the financial service, e.g., a data scientist or a crowd-sourced worker. As indicated in FIG. 5, this change might then be fed back through categorization service (503) to the software at the financial service and used when the categorization model is re-learned, e.g., with product data (504) maintained by the financial service and product data (505) from a third-party publisher of data, e.g., Semantics3.

Figure 6A:
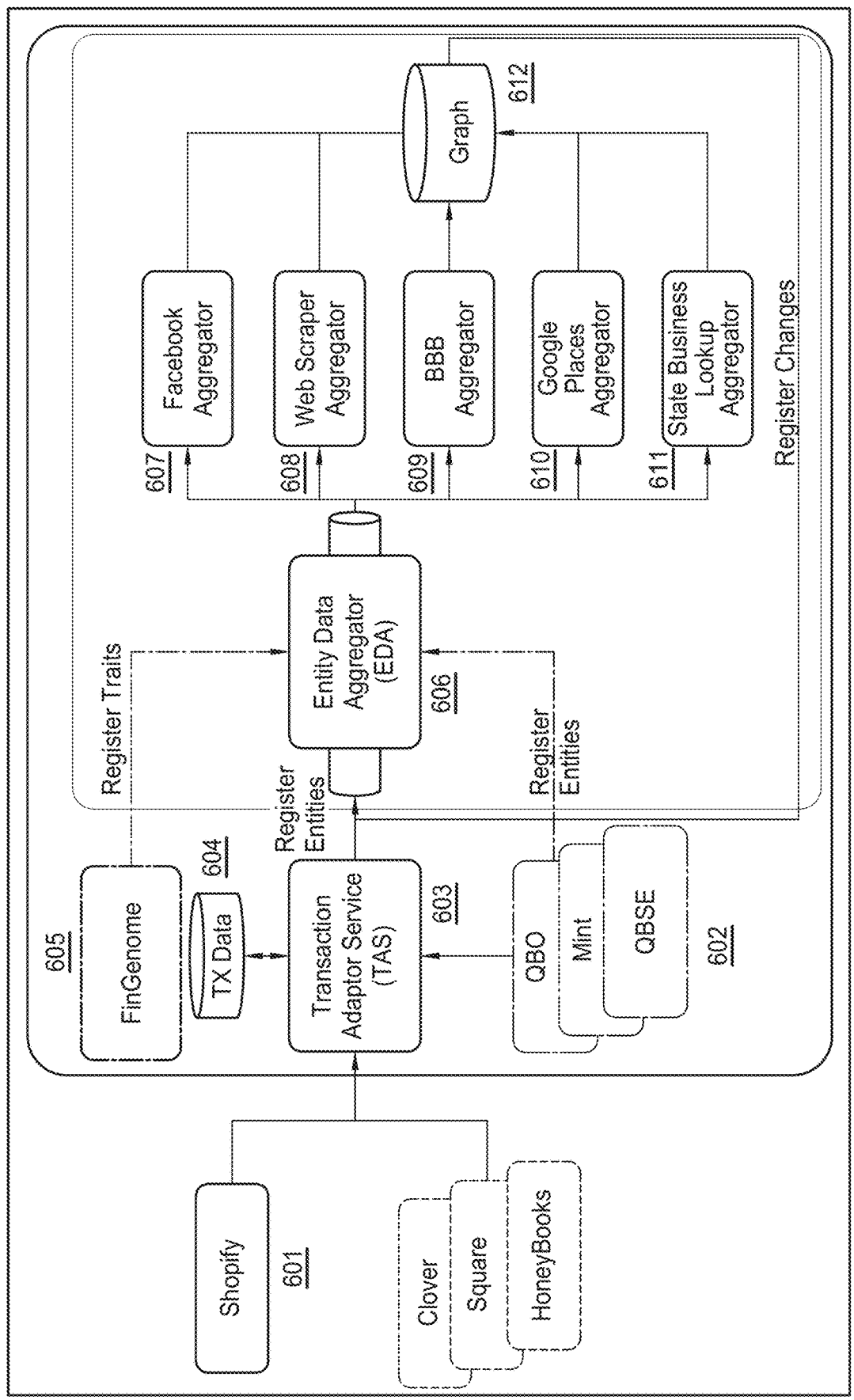
FIGS. 6A and 6B depict a process for aggregating data from internal sources and external sources for use by a categorization model, in accordance with one or more embodiments.
Figure 6B:
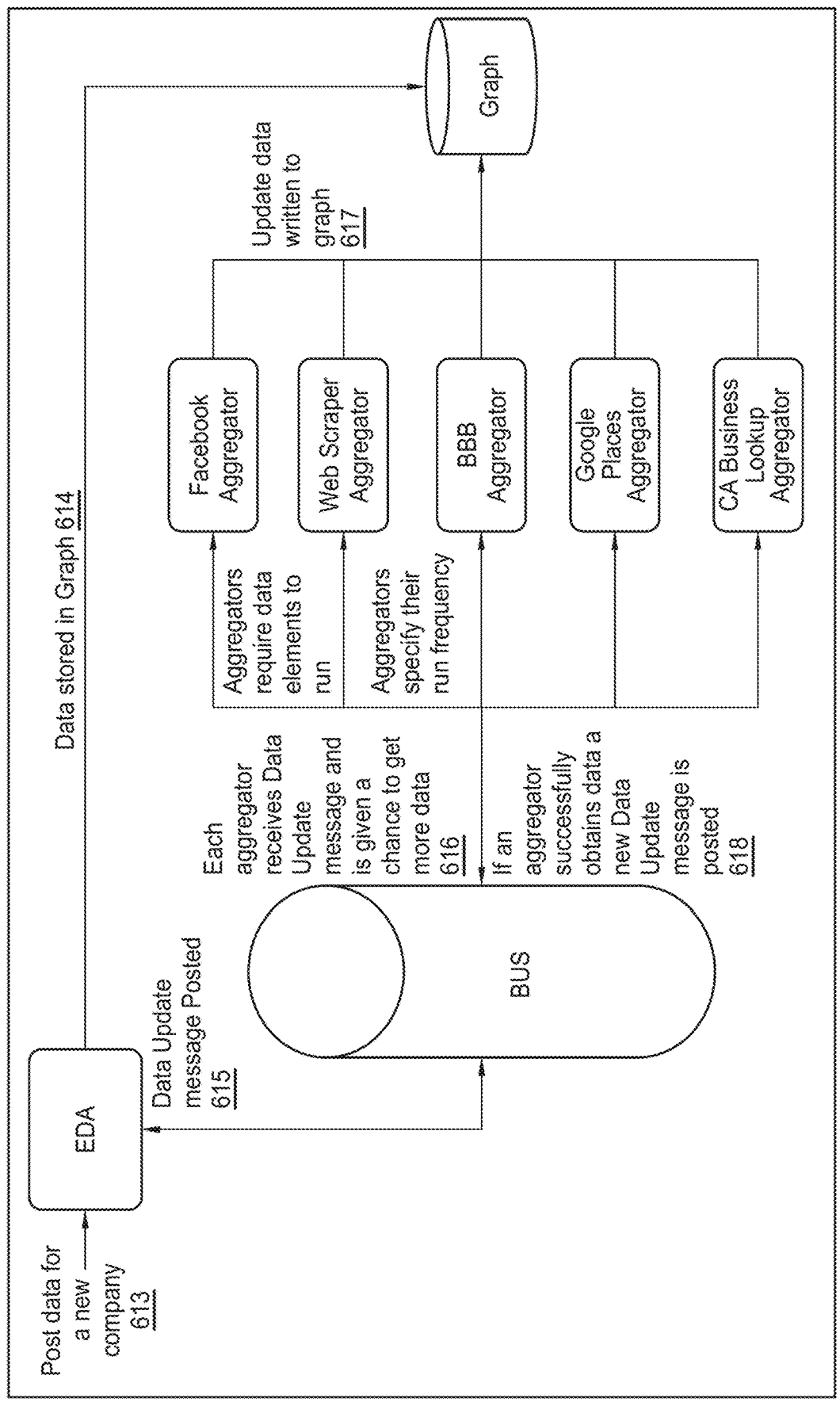

FIGS. 6A and 6B depict a process for aggregating entity data from internal sources and external sources for use by a categorization model, e.g., a product categorization model. As used in this disclosure, "entity data" is data associated with a business entity and includes profile data, transaction data, and behavior data. As depicted in FIG. 6A, software at a financial service includes two major components for aggregating from such data: (1) transaction adaptor service (TAS) (601); and (2) entity data aggregator (EDA) (602). In one or more embodiments, TAS (601) aggregates entity data from internal sources such as financial applications (603) provided by the financial service and entity data (605) obtained through an authorized access to a merchant platform, where, e.g., a business entity might maintain an online shop. Entity data (605) might include such information as a click stream, an abandoned cart, or a Facebook ad. TAS (601) might also obtain entity data through an authorized access from a commercial bank or credit card company and store that entity data in a database (604).

EDA (602) receives entity data from TAS (601), financial applications (603), and trait identifier (606) and publishes the entity data to a group of asynchronous, recursive aggregators that include Facebook aggregator (607), web-scraper aggregator (608), Better Business Bureau (BBB) aggregator (609), Google Places aggregator (610), and CA (California) business lookup aggregator (611). In one or more embodiments, trait identifier (606) might analyze entity data from internal and external sources to identify financial traits and/or personal traits such as "lives paycheck to paycheck". In one or more embodiments, the analysis might involve multinomial classification using neural networks, K-nearest neighbors, naive Bayes, decision trees, support vector machines, etc. As used in this disclosure, "asynchronous" means that each of the aggregators acts independent of each other when obtaining additional entity data and providing it to EDA (602) for publication.

As suggested by its name, Facebook aggregator (607) uses the published entity data to obtain additional entity data from online social networks, which, in turn, is published by EDA (602) to the other aggregators, creating a recursion. Similar recursions are created by each of the other aggregators when they use published entity data to obtain additional entity data. As suggested by its name, web-scraper aggregator (608) uses the published entity data to obtain additional entity through scraping a web page. It will be appreciated that such scraping is useful to obtain entity data without having an express agreement with the website whose entity data is scraped. In one or more embodiments, web-scraper aggregator (608) might use a web service such as BuiltWith™ to identify which websites use, e.g., Shopify™, and therefore are likely to have relevant business-entity data. BBB aggregator (609) uses the published entity data to obtain additional entity data from organizations that monitor business reputation. Google Places aggregator (610) uses the published data to uses the published entity data to obtain additional entity data from websites that maintain entity data about places, e.g., physical locations. And state business lookup aggregator (611) uses the published entity data to obtain additional entity data from websites provided by governmental agencies that regulate business entities (e.g., the California Secretary of State).

Returning to FIG. 6A, all of the entity data collected by TSA (601) and EDA (602) ultimately becomes the basis for a categorization or knowledge graph (612).

FIG. 6B provides further details about the process of aggregating data from internal sources and external sources for use by a categorization model. In operation 613, entity data for a new company is posted to the EDA. In turn, the EDA stores the data in a categorization or knowledge graph, in operation 614, and posts a data-update message to a bus, in operation 615. In operation 616, each aggregator receives the data update message and is given a chance to get more data asynchronous of the other aggregators. As indicated in FIG. 6B, each aggregator requires entity-data elements to run and each aggregator specifies its own run frequency. If an aggregator successfully obtains more entity data, it written to the graph, in operation 617, and a new data-update message is posted to the bus, in operation 618. Then, in operation 615, the new data-update message is picked up by the EDA, which re-initiates the process.

Figure 7:
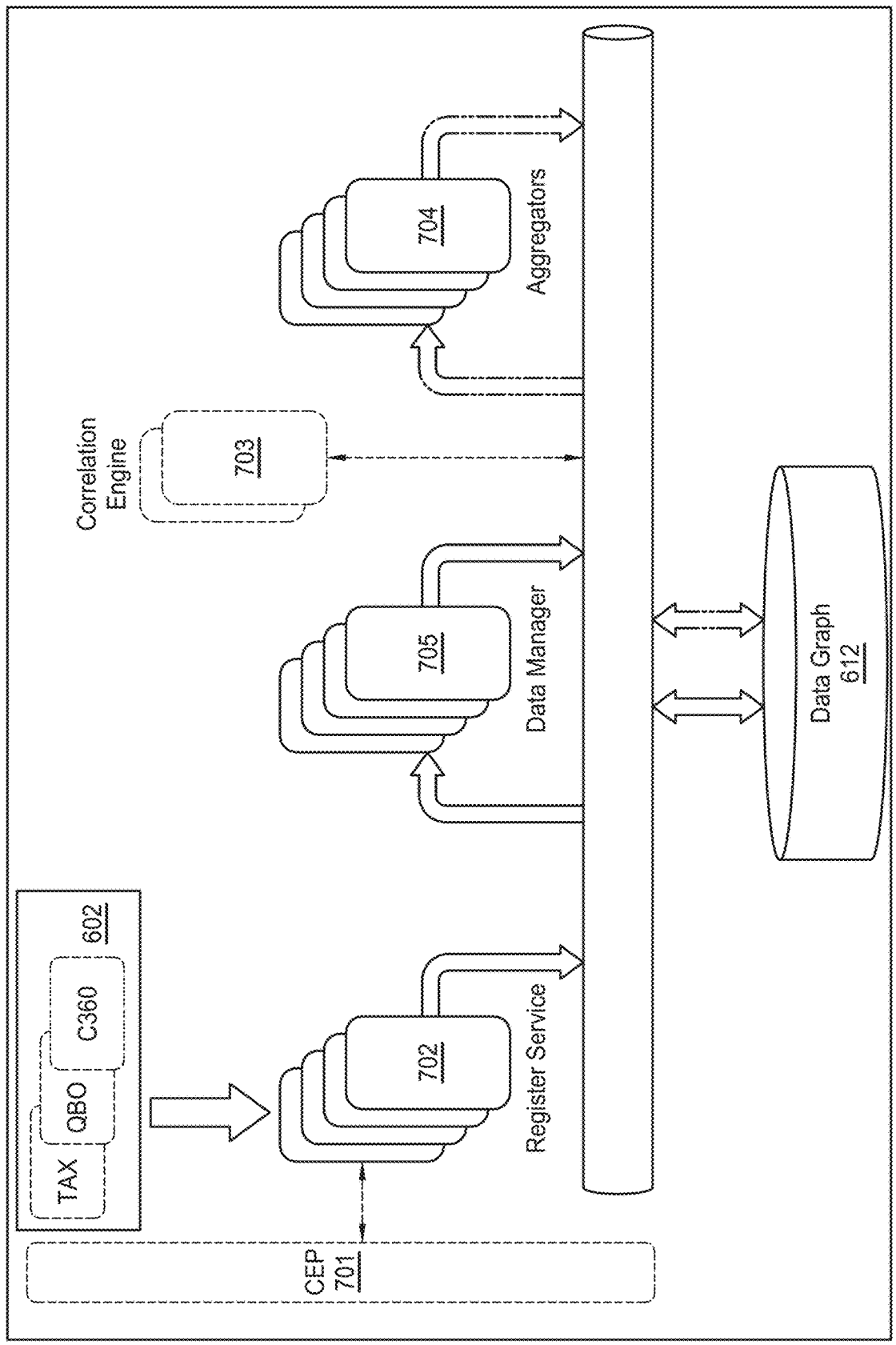
FIG. 7 depicts a correlation engine, in accordance with one or more embodiments.

FIG. 7 depicts a register service and correlation engine, in accordance with one or more embodiments. As depicted in this figure, business-entity data from online financial applications (703) at a financial service is provided to a register service (702), which is also part of the financial service. The register service performs complex event processing (CEP) on business-entity data to create processed business-entity data and then posts some or all of the business-entity data and the processed business-entity data on the bus, where it is received by other components that have registered for the posts. The other components include EDA (602), a correlation engine (703), the various aggregators (704) discussed above, and a categorization or knowledge graph 612. In one or more embodiments, the correlation engine (703) correlates business-entity data posted by the other components. As used in this disclosure, "correlation" involves reconciling conflicting elements of business-entity data based on indicia of reliability. So for example, if the Google Places aggregator posted a location for a business entity that conflicted with the location posted by the online financial applications (603), the correlation engine might resolve the location in favor of the location posted by the Google Places aggregator if the post from that post had a later timestamp than the post from the online financial applications (603). Alternatively, the correlation engine might resolve the location in favor of the location posted by the online financial applications (603), since the location originated with the financial service and therefore complies with the financial services' standards for trustworthiness.

In one or more embodiments, the correlation engine might use a master data management (MDM) tool to correlate the business-entity data. Here it will be appreciated that master data is data that is critical to a business entity and that an MDM tool is a software tool that supports the identification, linking, and synchronization of customer information across heterogeneous data sources through semantic reconciliation of master data. Some MDM tools remove duplicates, standardize data, and incorporate rules to prevent incorrect data from entering a data system in order to create an authoritative source of master data. Suppliers of such tools include Ataccama, Del Boomi, and Orchestra Networks, as well as IBM, SAP, and Oracle.

Alternatively or additionally, the correlation engine might use deep learning based on neural networks to correlate the business-entity data. If the business-entity data is quantitative, the correlation engine might use statistical correlation to correlate the business-entity data. In one or more embodiments, the correlation engine might be updated with manual feedback in order to improve its accuracy.

Figure 8A:
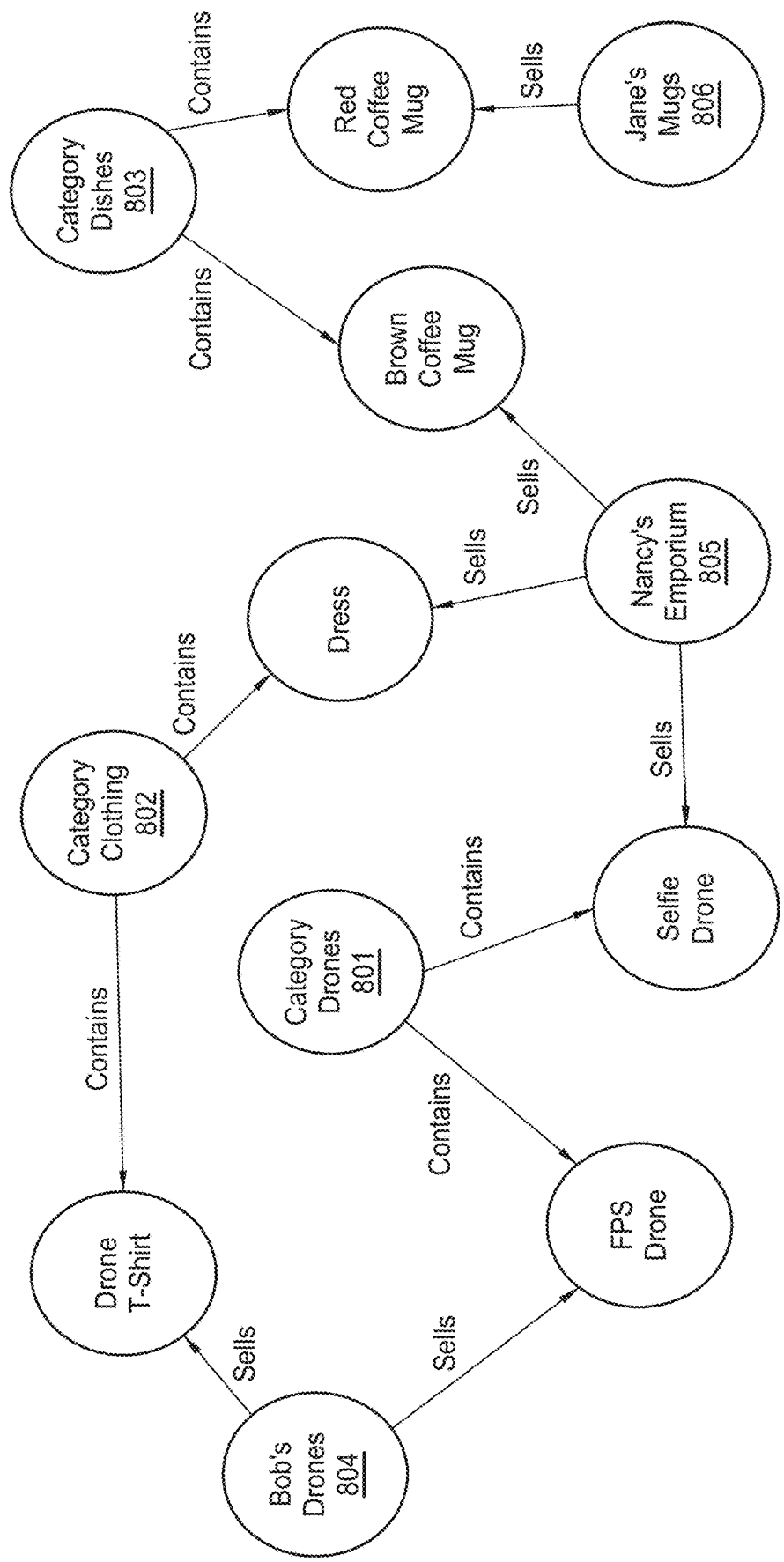
FIG. 8A depicts a categorization graph for products, in accordance with one or more embodiments.

FIG. 8A depicts a categorization graph for products, in accordance with one or more embodiments. It will be recalled that a categorization graph is generated from aggregated business-entity data by application of a categorization model, in one or more embodiments. In one or more embodiments, a categorization model based on a naïve Bayes algorithm, might be used to create the categorization graph. In other embodiments, the categorization model might be based on logistic regression, support vector machines, decision trees, etc. In operation 402, the software generates cohort clusters of similar business entities by applying a clustering algorithm (e.g., K-means) to the categorization graph. As depicted in this figure, a categorization graph for products includes three categories: (a) category drones (801); (b) category clothing (802); and category dishes (803). Category drones (801) contain two products, an FPS drone and a selfie drone. Category clothing (802) also contains two products, drone t-shirt and dress. And category dishes (803) contain two products, brown coffee mug and red coffee mug. Bob's Drones (804) is a business entity that sells both drone t-shirts and FPS drones. Nancy's Emporium (805) is a business entity that sells a selfie drone, a dress, and a brown coffee mug. Jane's Mugs (806) is a business entity that sells a red coffee mug.

Figure 8B:
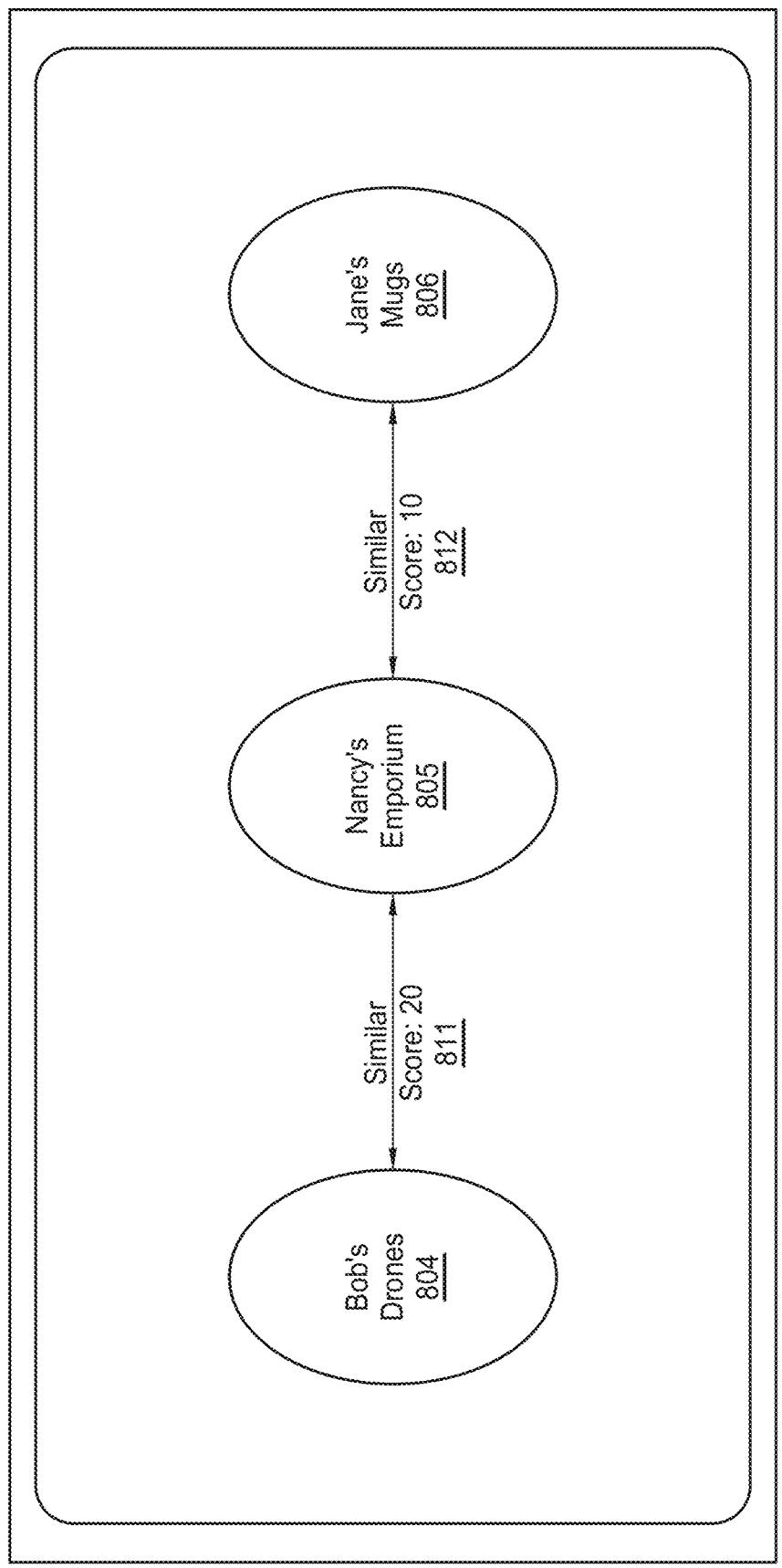
FIG. 8B depicts a scored similarity diagram for products, in accordance with one or more embodiments.

FIG. 8B depicts a scored similarity diagram for products, in accordance with one or more embodiments. As depicted in this figure, the similarity score (811) between Bob's Drones (804) and Nancy's Emporium (805) is 20 since they both sell drones and clothing. The similarity score (812) between Nancy's Emporium (805) and Jane's Mugs (806) is only 10, since they both sell mugs. In one or more embodiments, a threshold of 20 might be applied to similarity scores to determine whether business entities are similar. In that event, Bob's Drones (804) and Nancy's Emporium (805) would be determined to be similar businesses for purposes of a cohort cluster that could be used to learn an extrapolation model and/or to provide similar business entities for comparison. Alternatively, the specified threshold might be expressed as a percentage of overlap, e.g., the quantity of overlap as whole, in one or more embodiments.

Figure 9:
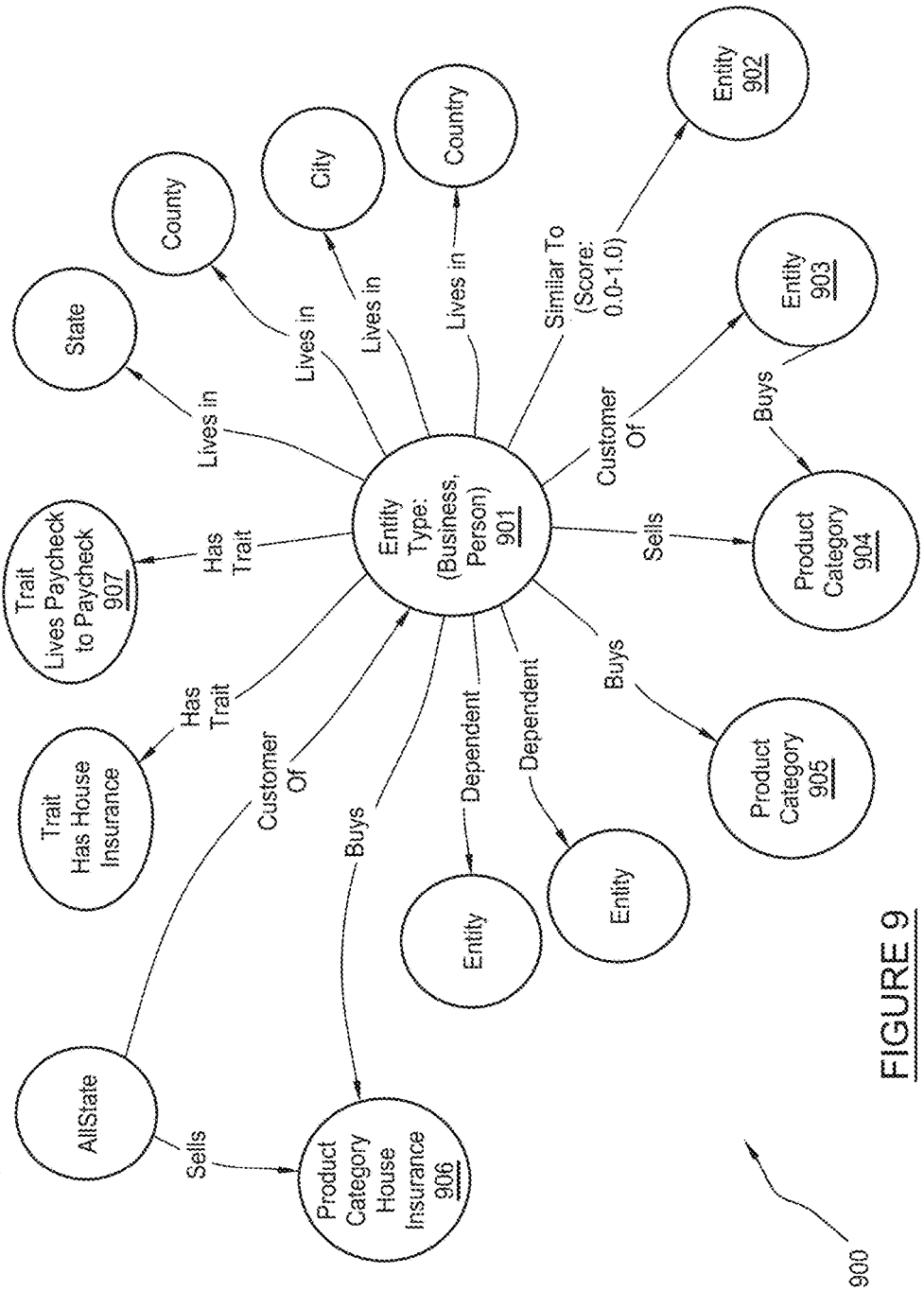
FIG. 9 depicts a knowledge graph for an entity, in accordance with one or more embodiments.

FIG. 9 depicts a knowledge graph for an entity, in accordance with one or more embodiments. As depicted in this figure, knowledge graph (900) includes business entity (901), which is similar to business entity (902) and which has business entity (903) as a customer. Additionally, business entity (901) sells product category (904) and buys product category (905) and product category (906) from product suppliers that are not shown. Business category (901) also has a trait (907) of "Lives Paycheck to Paycheck" identified by a trait identifier as described above. Trait (907) was used in a user interface to retrieve knowledge graph (900), as shown by the queries at the top of the figure. Here again, since business entity (901) is similar to business entity (902), they would be determined to be similar businesses for purposes of a cohort cluster that could be used to learn an extrapolation model and/or to provide similar business entities for comparison.

Figure 10A:
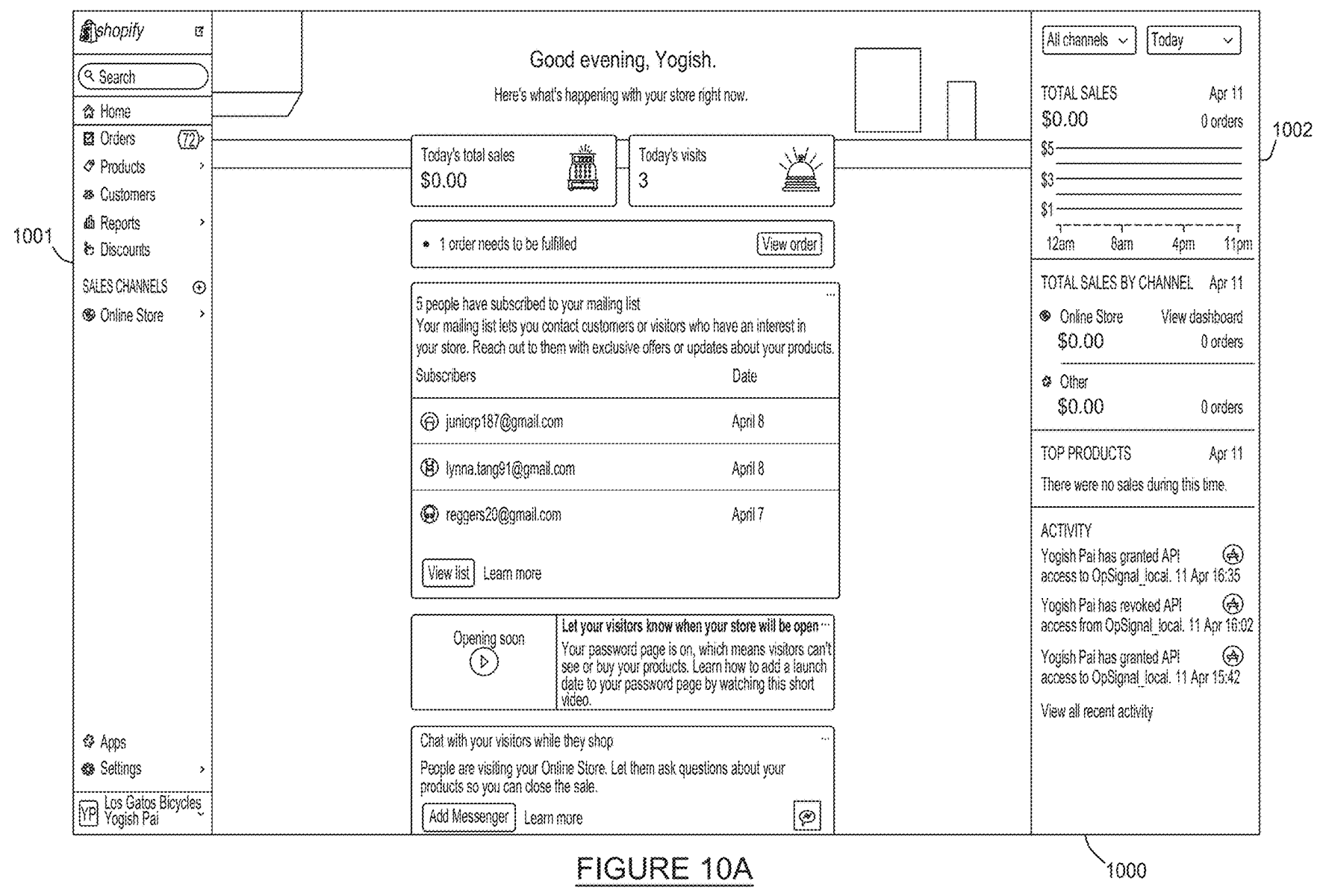

FIG. 10A shows a view in a graphical user interface (GUI) displayed by an online shop on a merchant platform, in accordance with one or more embodiments. As shown in this figure, parent view (1000) includes a child view (1001) which allows the user of the merchant app to display orders, products, customers, reports, discounts, sales channels, and apps, including an app called "OpSignal", discussed in the following paragraph. Parent view (1000) also includes a child view (1002) which displays total sales, total sales by channel, top products, and activity.

Figure 10B:
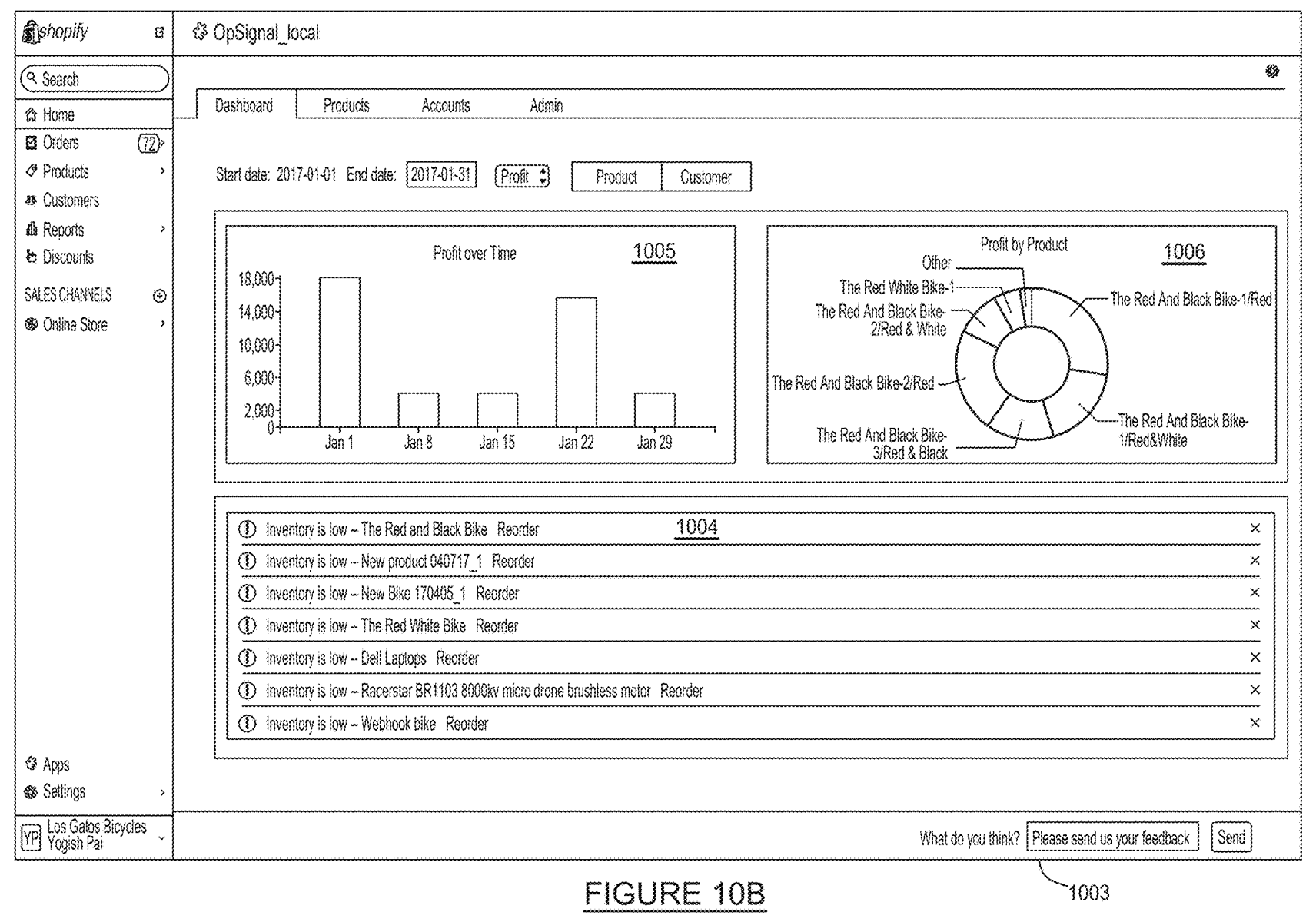

FIG. 10B shows a GUI view displayed by a merchant app called "OpSignal" that runs on the merchant platform. In one or more embodiments, the merchant app might be a third-party app developed by a financial service and distributed through the merchant platform's app store. As shown in this figure, the GUI view is a dashboard (1003) for the online store. The dashboard displays inventory levels (1004), which might be predicted using the extrapolation model described above. The dashboard (1000) also includes a bar graph (1005) which shows profit over time and a pie chart (1006) which shows profit by product.

The following use cases are for explanatory purposes only and not intended to limit the scope of the invention.

Figure 11:
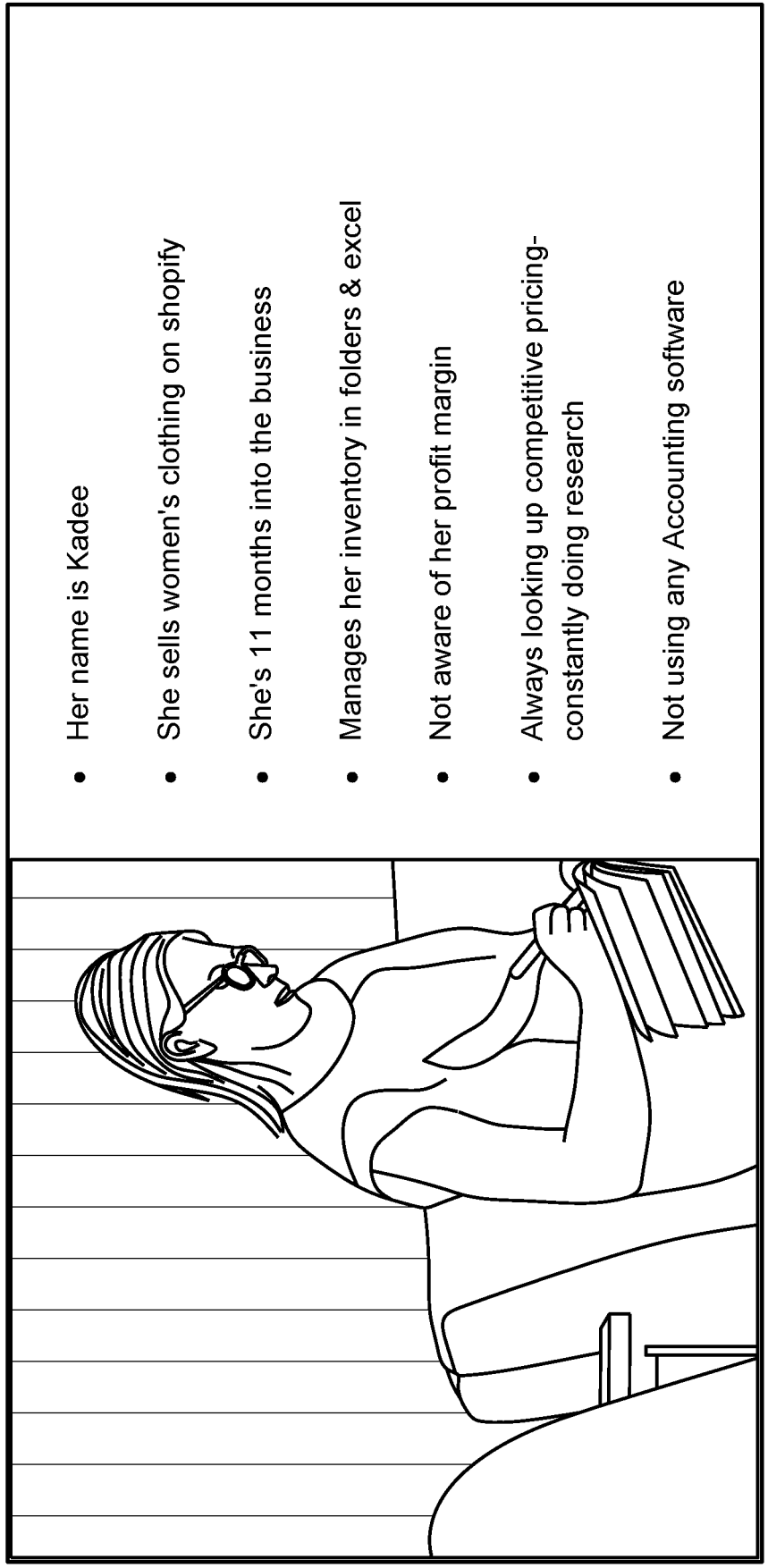
FIG. 11 describes a typical user of an online merchant platform, for purposes of use cases in accordance with one or more embodiments.

FIG. 11 describes a typical small-business owner that is a part of today's online economy. Her name is Kadee and she has been selling women's clothing from an online shop on an e-commerce site for almost a year. She manages her inventory in a rudimentary manner, using folders and spreadsheets. Kadee is not aware of the profit margin for her online shop. She is also constantly doing research to find out what competitors are charging for the same products. Kadee is not an accountant, so she is not using any accounting software and consequently is not making confident business decisions.

Kadee installs the OpSignal in her Shopify™ shop. The application was developed by Intuit® and distributed through the Shopify™ store. The application includes a GUI with views that Kadee uses to enter business-entity data about her shop, including business-entity data about her inventory and sales. In turn, that business-entity data becomes an input to an extrapolation model for inventory hosted at the Intuit website. The extrapolation model uses the business-entity data to predict inventory levels, adjusted for seasonality and local current events, for Kadee's shop a week out, two weeks out, three weeks out, and four weeks out. The app reports those predictions to Kadee in a GUI view such as FIG. 10B. After Kadee has gains confidence in the application, Kadee decides to investigate the financial service's other offerings and eventually becomes a user of an online financial application at the financial service. Hence, in one or more embodiments, the application might be used a promotional item for the financial service.

The business-entity data input by Kadee also becomes input to an extrapolation model for cash on hand hosted at the Intuit website. The extrapolation model uses the business-entity data to predict cash-on-hand for Kadee's shop a week out, two weeks out, three weeks out, and four weeks out. The app then reports those predictions to Kadee in a GUI view.

Another GUI view displayed by the app shows that one of the dresses sold by Kadee has been classified as an "accessory". Kadee uses the view to re-categorize the dress as a "dress". The re-categorization is communicated to the Intuit® website where it is used to relearn the categorization model, either at a later point in time as part of a periodic batch on in real-time as part of a stream.

Figure 12A:
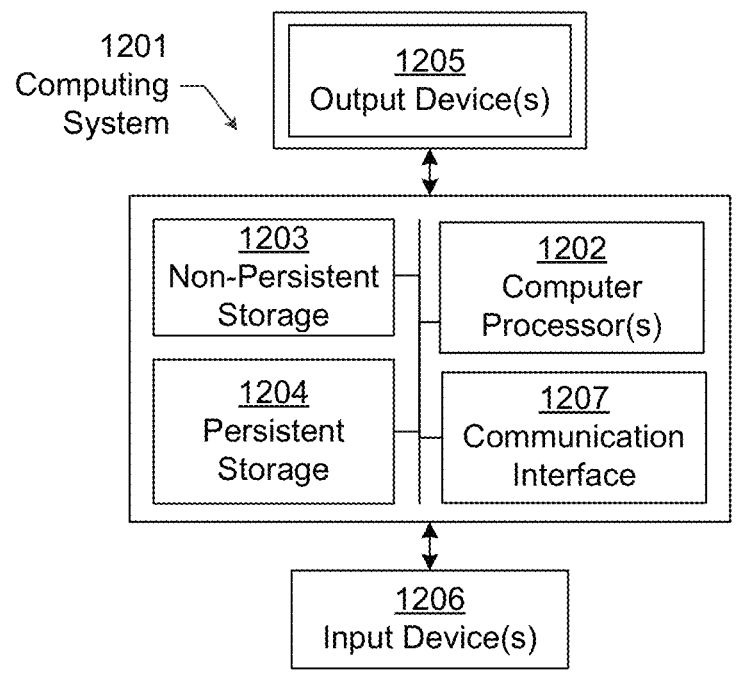
FIGS. 12A and 12B depict a computing system, in accordance with one or more embodiments of the invention.

Embodiments of the invention, including user computing device X (202) and user computing device Y (203), may be implemented on a computing system (1201). Any combination of mobile, desktop, server, embedded, or other types of hardware may be used. For example, as shown in FIG. 12A, the computing system (1201) may include one or more computer processor(s) (1202), associated memory (1203) (e.g., random access memory (RAM), cache memory, flash memory, etc.), one or more storage device(s) (1204) (e.g., a hard disk, an optical drive such as a compact disk (CD) drive or digital versatile disk (DVD) drive, a flash memory stick, etc.), communication interface (1207) and numerous other elements and functionalities. The computer processor(s) (1202) may be an integrated circuit for processing instructions. For example, the computer processor(s) may be one or more cores, or micro-cores of a processor. The computing system (1201) may also include one or more input device(s) (1206), such as a touchscreen, keyboard, mouse, microphone, touchpad, electronic pen, or any other type of input device. Further, the computing system (1201) may include one or more output device(s) (1205), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1201) may be connected to a network (1220) (e.g., a local area network (LAN), a wide area network (WAN) such as the Internet, mobile network, or any other type of network) via a network interface connection (not shown). The input and output device(s) may be locally or remotely (e.g., via the network (1220)) connected to the computer processor(s) (1202), memory (1203), and storage device(s) (1204). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (1201) may be located at a remote location and connected to the other elements over a network (1220). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 12B:
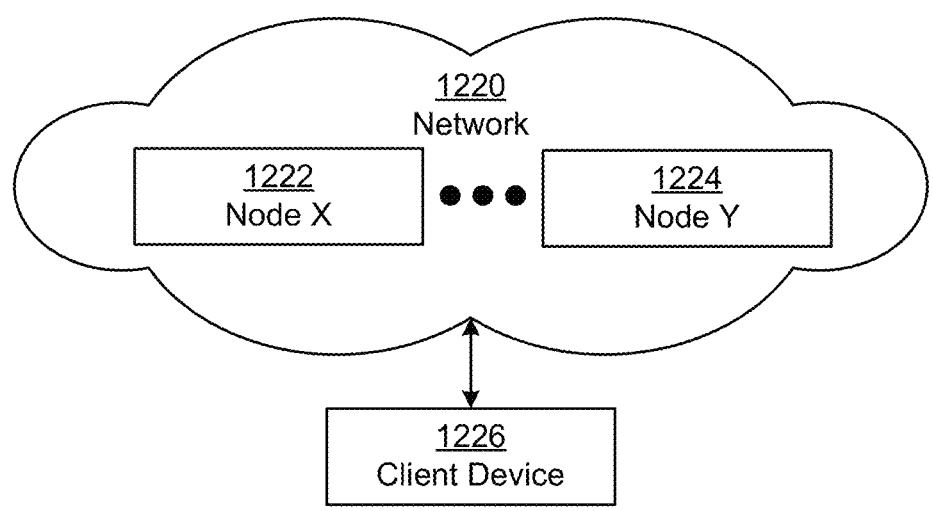

As noted above, the computing system (1201) in FIG. 12A may be connected to or be a part of a network. For example, as shown in FIG. 12B, the network (1220) may include multiple nodes (e.g., node X (1222), node Y (1224)). Each node may correspond to a computing system, such as the computing system shown in FIG. 12A, or a group of nodes combined may correspond to the computing system shown in FIG. 12A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1201) may be located at a remote location and connected to the other elements over a network.

Although not shown in FIG. 12B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1222), node Y (1224)) in the network (1220) may be configured to provide services for a client device (1226). For example, the nodes may be part of a cloud computing system. The nodes may include functionality to receive requests from the client device (1226) and transmit responses to the client device (1226). The client device (1226) may be a computing system, such as the computing system shown in FIG. 12A. Further, the client device (1226) may include and/or perform all or a portion of one or more embodiments of the invention.

The computing system or group of computing systems described in FIGS. 12A and 12B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 12A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 12A and the nodes and/or client device in FIG. 12B. Other functions may be performed using one or more embodiments of the invention.

Although example embodiments of the inventions have been described in some detail for purposes of clarity of understanding, it will be apparent that certain changes and modifications can be practiced within the scope of the following claims. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A computer-implemented method, comprising:
   recursively obtaining first aggregated data, second aggregated data, and third aggregated data by:
      obtaining, by a first data aggregator, the first aggregated data,
      in response to obtaining the first aggregated data, posting, by the first data aggregator, a message to a bus,
      in response to the first data aggregator posting the message, reading, by a second data aggregator, the message from the bus,
      in response to the second data aggregator reading the message, obtaining, by the second data aggregator and using the first aggregated data, the second aggregated data, and
      using the second aggregated data to obtain the third aggregated data;
   identifying a plurality of product categories by applying a categorization model to product data that includes product names, product descriptions, the first aggregated data, the second aggregated data, and the third aggregated data, wherein the product data is obtained from internal sources and external sources;
   creating a knowledge graph for a plurality of business entities from inputs that include the plurality of product categories, published data that includes merchant categorizations, and geographical data, the knowledge graph comprising:
      a plurality of stored nodes in a graph database, the plurality of stored nodes for a plurality of product categories, business entities, and products;
      a plurality of stored references between the plurality of stored nodes, the plurality of stored references each linking two stored nodes of the plurality of stored nodes and comprising a relationship identifier between the two stored nodes,
         the plurality of stored references comprising a sell relationship identifier and a containment relationship identifier;
   traversing the plurality of stored nodes in the knowledge graph when applying a clustering algorithm to the knowledge graph, wherein the clustering algorithm generates a plurality of cohort clusters, and wherein the clustering algorithm uses a K-means algorithm;
   using the plurality of cohort clusters to learn a first extrapolation model for predicting inventory; and
   providing access to the first extrapolation model to predict inventory level at a specific point in time, wherein the access is provided via a merchant application that runs on an online merchant platform.

2. The computer-implemented method of claim 1, wherein the inputs further include a plurality of product suppliers.

3. The computer-implemented method of claim 1, wherein the categorization model uses a naïve Bayesian algorithm, and wherein the first extrapolation model is a hybrid model that includes linear extrapolation and seasonal extrapolation.

4. The computer-implemented method of claim 1, further comprising:
   using the cohort clusters to prime a second extrapolation model for predicting cash on hand; and
   providing access to the second extrapolation model to predict cash on hand at a specific point in time, wherein the access is provided via a financial application.

5. The computer-implemented method of claim 1, wherein the merchant categorizations include one or both of merchant category code (MCC) codes and North American Industry Classification System (NAICS) codes.

6. The computer-implemented method of claim 1, wherein the product categorization model is updated using feedback in the form of manual product categorizations.

7. The computer-implemented method of claim 1, wherein the merchant application is a third-party application distributed through a store hosted by the online merchant platform.

8. A computer-readable media that are non-transitory and that store a program, which when executed by a processor, performs:
   recursively obtaining first aggregated data, second aggregated data, and third aggregated data by:
      obtaining, by a first data aggregator, the first aggregated data,
      in response to obtaining the first aggregated data, posting, by the first data aggregator, a message to a bus,
      in response to the first data aggregator posting the message, reading, by a second data aggregator, the message from the bus,
      in response to the second data aggregator reading the message, obtaining, by the second data aggregator and using the first aggregated data, the second aggregated data, and
      using the second aggregated data to obtain the third aggregated data;
   identifying a plurality of product categories by applying a categorization model to product data that includes product names, product descriptions, the first aggregated data, the second aggregated data, and the third aggregated data, wherein the product data is obtained from internal sources and external sources;
   creating a categorization graph for a plurality of business entities from inputs that include the plurality of product categories, published data that includes merchant categorizations, and geographical data, the categorization graph comprising:
      a plurality of stored nodes in a graph database, the plurality of stored nodes for a plurality of product categories, business entities, and products;
      a plurality of stored references between the plurality of stored nodes, the plurality of stored references each linking two stored nodes of the plurality of stored nodes and comprising a relationship identifier between the two stored nodes,
         the plurality of stored references comprising a sell relationship identifier and a containment relationship identifier;
   traversing the plurality of stored nodes in the categorization graph when applying a clustering algorithm to the categorization graph, wherein the clustering algorithm generates a plurality of cohort clusters, and wherein the clustering algorithm uses a K-means algorithm;

using the plurality of cohort clusters to learn a first extrapolation model for predicting inventory; and
providing access to the first extrapolation model to predict inventory level at a specific point in time, wherein the access is provided via a merchant application that runs on an online merchant platform.

9. The computer-readable media of claim 8, wherein the inputs further include a plurality of product suppliers.

10. The computer-readable media of claim 8, wherein the categorization model uses a naïve Bayesian algorithm, and wherein the first extrapolation model is a hybrid model that includes linear extrapolation and seasonal extrapolation.

11. The computer-readable media of claim 8, wherein the program, when executed by a processor, performs:
using the cohort clusters to prime a second extrapolation model for predicting cash on hand; and
providing access to the second extrapolation model to predict cash on hand at a specific point in time, wherein the access is provided via a financial application.

12. The computer-readable media of claim 8, wherein the merchant categorizations include one or both of MCC (merchant category code) codes and NAICS (North American Industry Classification System) codes.

13. The computer-readable media of claim 8, wherein the product categorization model is updated using feedback in the form of manual product categorizations.

14. The computer-readable media of claim 8, wherein the merchant application is a third-party application distributed through a store hosted by the online merchant platform.

15. A system, comprising:
a hardware processor and memory; and
software instructions stored in the memory, which when executed by the hardware processor, cause the hardware processor to:
recursively obtain first aggregated data, second aggregated data, and third aggregated data by:
obtaining, by a first data aggregator, the first aggregated data,
in response to obtaining the first aggregated data, posting, by the first data aggregator, a message to a bus,
in response to the first data aggregator posting the message, reading, by a second data aggregator, the message from the bus,
in response to the second data aggregator reading the message, obtaining, by the second data aggregator and using the first aggregated data, the second aggregated data, and
using the second aggregated data to obtain the third aggregated data;
identify a plurality of product categories by applying a categorization model to product data that includes product names, product descriptions, the first aggregated data, the second aggregated data, and the third aggregated data, wherein the product data is obtained from internal sources and external sources;
create a categorization graph for a plurality of business entities from inputs that include the plurality of product categories, published data that includes merchant categorizations, and geographical data, the categorization graph comprising:
a plurality of stored nodes in a graph database, the plurality of stored nodes for a plurality of product categories, business entities, and products;
a plurality of stored references between the plurality of stored nodes, the plurality of stored references each linking two stored nodes of the plurality of stored nodes and comprising a relationship identifier between the two stored nodes,
the plurality of stored references comprising a sell relationship identifier and a containment relationship identifier;
traversing the plurality of stored nodes in the knowledge graph when applying a clustering algorithm to the categorization graph, wherein the clustering algorithm generates a plurality of cohort clusters, and wherein the clustering algorithm uses a K-means algorithm;
use the plurality of cohort clusters to learn a first extrapolation model for predicting inventory; and
provide access to the first extrapolation model to predict inventory level at a specific point in time, wherein the access is provided via a merchant application that runs on an online merchant platform.

16. The system of claim 15, further comprising software instructions which cause the hardware processor to:
use the cohort clusters to prime a second extrapolation model for predicting cash on hand; and
provide access to the second extrapolation model to predict cash on hand at a specific point in time, wherein the access is provided via a financial application.

\* \* \* \* \*